US012766852B2

(12) United States Patent
Ikoshi et al.

(10) Patent No.: US 12,766,852 B2
(45) Date of Patent: Oct. 20, 2026

(54) INK JET RECORDING METHOD

(71) Applicant: FUJIFILM Corporation, Tokyo (JP)

(72) Inventors: Masao Ikoshi, Kanagawa (JP); Taiga Mizoe, Kanagawa (JP); Takashi Mitsuyasu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 223 days.

(21) Appl. No.: 18/665,986

(22) Filed: May 16, 2024

(65) Prior Publication Data

US 2024/0300248 A1 Sep. 12, 2024

Related U.S. Application Data

(63) Continuation of application No. PCT/JP2022/042701, filed on Nov. 17, 2022.

(30) Foreign Application Priority Data

Nov. 25, 2021 (JP) ................................ 2021-191601

(51) Int. Cl.

| | |
|---|---|
| ***B41J 2/21*** | (2006.01) |
| ***B41M 5/00*** | (2006.01) |
| ***B41M 5/52*** | (2006.01) |
| ***C09D 11/30*** | (2014.01) |
| ***C09D 11/322*** | (2014.01) |
| ***C09D 11/40*** | (2014.01) |
| ***C09D 11/54*** | (2014.01) |

(52) U.S. Cl.

CPC ............ *B41J 2/2117* (2013.01); *B41J 2/2114* (2013.01); *B41M 5/0011* (2013.01); *B41M 5/0047* (2013.01); *B41M 5/0064* (2013.01); *B41M 5/52* (2013.01); *C09D 11/30* (2013.01); *C09D 11/322* (2013.01); *C09D 11/40* (2013.01); *C09D 11/54* (2013.01); *B41M 5/0017* (2013.01)

(58) Field of Classification Search

CPC ........ B41J 2/2117; B41J 2/2114; B41M 5/52; B41M 5/0047; B41M 5/0064; B41M 5/0023; B41M 5/0017; B41M 5/00; B41M 5/0011; C09D 11/322; C09D 11/40; C09D 11/54; C09D 11/30

See application file for complete search history.

(56) References Cited

U.S. PATENT DOCUMENTS

| | | | | |
|---|---|---|---|---|
| 9,376,582 | B1 * | 6/2016 | Dannhauser | B41M 5/0064 |
| 2016/0052302 | A1 | 2/2016 | Willems et al. | |
| 2016/0289471 | A1 | 10/2016 | Fujii | |
| 2020/0047524 | A1 * | 2/2020 | Ohnishi | B41J 11/0015 |
| 2021/0094325 | A1 | 4/2021 | Fujii et al. | |

FOREIGN PATENT DOCUMENTS

| | | | |
|---|---|---|---|
| CN | 112423992 | A | 2/2021 |
| JP | 2004-291237 | A | 10/2004 |
| JP | 2004-291239 | A | 10/2004 |
| JP | 2009-248354 | A | 10/2009 |
| JP | 2016-525950 | A | 9/2016 |

OTHER PUBLICATIONS

Communication dated Feb. 25, 2025 issued by the European Patent Office in application No. 22898494.4.

International Search Report dated Dec. 20, 2022, issued in International Application No. PCT/JP2022/042701.

Written Opinion dated Dec. 20, 2022, issued in International Application No. PCT/JP2022/042701.

International Preliminary Report on Patentability dated May 2, 2024, issued in International Application No. PCT/JP2022/042701.

Office Action dated Dec. 23, 2025 in Chinese Application No. 202280077793.X.

Office Action dated Feb. 10, 2026 in Japanese Application No. 2023-563653.

Communication dated Jul. 30, 2026, issued in Chinese Application No. 202280077793.X.

* cited by examiner

*Primary Examiner* — Douglas X Rodriguez
*Assistant Examiner* — Kyra Melor Van Kreuningen
(74) *Attorney, Agent, or Firm* — Sughrue Mion, PLLC

(57) ABSTRACT

Provided is an ink jet recording method including an ink applying of applying an ink containing water onto an impermeable base material using an ink jet method, in which the ink applying is performed by applying the ink onto the impermeable base material under a condition that a polarity of static electricity of a surface of the impermeable base material to which the ink is applied is opposite to a polarity of a zeta potential of the ink.

14 Claims, No Drawings

INK JET RECORDING METHOD

CROSS-REFERENCE TO RELATED APPLICATIONS

This application is a continuation application of International Application No. PCT/JP2022/042701, filed Nov. 17, 2022, the disclosure of which is incorporated herein by reference in its entirety. Further, this application claims priority from Japanese Patent Application No. 2021-191601, filed Nov. 25, 2021, the disclosure of which is incorporated herein by reference in its entirety.

BACKGROUND OF THE INVENTION

1. Field of the Invention

The present disclosure relates to an ink jet recording method.

2. Description of the Related Art

In the related art, various examinations have been conducted on ink jet recording methods.

For example, JP2004-291237A discloses, as an ink jet recording medium and an ink jet recording method with excellent image density and excellent ink fixing properties, an ink jet recording medium including at least one ink absorbing layer on a support, in which a recording surface of the ink jet recording medium has a zeta potential of +5 mV or greater and +30 mV or less at a pH of 7, and an ink jet recording method of performing recording on the ink jet recording medium with a recording liquid having a negative zeta potential.

SUMMARY OF THE INVENTION

As described above, JP2004-291237A discloses an ink jet recording method of recording an image on a recording medium including an ink absorbing layer.

However, as a result of examination conducted by the present inventors, it has been found that in a case where an impermeable base material is used as a recording medium in place of a recording medium including an ink absorbing layer, and an image is recorded on this impermeable base material with an ink containing water, degradation of the image quality due to a decrease in jet accuracy of the ink and a shift of the jet timing is likely to occur.

Here, the decrease in jet accuracy of the ink denotes that the position accuracy of a point where the ink reaches the impermeable base material is degraded, and the shift of the jet timing of the ink denotes that the timing of the ink reaching the impermeable base material is shifted from the ideal timing.

An object of one aspect of the present disclosure is to provide an ink jet recording method that enables recording of an image, in which degradation of the image quality due to a decrease in jet accuracy of an ink and/or a shift of the jet timing is suppressed, with an ink containing water on an impermeable base material.

The present disclosure includes the following aspects.

<1> An ink jet recording method comprising: an ink applying step of applying an ink containing water onto an impermeable base material using an ink jet method, in which, in the ink applying step, the ink is applied onto the impermeable base material under a condition that a polarity of static electricity on a surface of the impermeable base material to which the ink is applied is opposite to a polarity of a zeta potential of the ink.

<2> The ink jet recording method according to <1>, in which, in the ink applying step, the ink is applied onto the impermeable base material under a condition that in a case where an amount of the static electricity on the surface of the impermeable base material to which the ink is applied is defined as A kV and the zeta potential of the ink is defined as B mV, a difference [A−B] which is a value obtained by subtracting B from A is in a range of 30 to 110.

<3> The ink jet recording method according to <2>, in which, in the ink applying step, the ink is applied onto the impermeable base material under a condition that the difference [A−B] is in a range of 45 to 70.

<4> The ink jet recording method according to any one of <1> to <3>, in which the zeta potential of the ink is in a range of −80 mV to −30 mV.

<5> The ink jet recording method according to any one of <1> to <4>, in which an amount of the static electricity on the surface of the impermeable base material to which the ink is applied is in a range of 10 kV to 30 kV.

<6> The ink jet recording method according to any one of <1> to <5>, in which the impermeable base material is a resin base material.

<7> The ink jet recording method according to any one of <1> to <6>, further comprising: a pretreatment liquid applying step of applying a pretreatment liquid that contains water and an aggregating agent onto the impermeable base material before the ink applying step, in which, in the ink applying step, the ink is applied onto a region of the impermeable base material to which the pretreatment liquid has been applied.

<8> The ink jet recording method according to any one of <1> to <7>, in which an ink set including at least one colored ink that contains water and a color pigment and at least one white ink that contains water and a white pigment is used, and in the ink applying step, each of the at least one colored ink and the at least one white ink (ink set) is applied onto an identical surface of the impermeable base material using an ink jet method in a state where Condition a1, Condition a2, and Condition a3 are satisfied, Condition a1: polarities of zeta potentials of all the inks which are the at least one colored ink and the at least one white ink are the same as each other, Condition a2: the polarity of the static electricity on the identical surface of the impermeable base material is opposite to the polarities of the zeta potentials of all the inks, and Condition a3: in a case where an amount of the static electricity on the identical surface of the impermeable base material is defined as A kV and the zeta potential of each of the at least one colored ink and the at least one white ink is defined as B mV, a difference [A−B] which is a value obtained by subtracting B from A is in a range of 30 to 110 in all the inks.

<9> The ink jet recording method according to <8>, in which the difference [A−B] for an ink to be applied last is greatest among the differences [A−B] for the ink set.

<10> The ink jet recording method according to <8> or <9>, in which in a case where n represents an integer of 2 or greater for the ink set, the difference [A−B] for an n-th ink in application order is greater than or equal to the difference [A−B] for an n-1-th ink in application order, and the difference [A−B] for an ink to be applied last is greater than the difference [A−B] for an ink to be applied first.

According to one aspect of the present disclosure, it is possible to provide an ink jet recording method that enables recording of an image, in which degradation of the image quality due to a decrease in jet accuracy of an ink and/or a shift of the jet timing is suppressed, with an ink containing water on an impermeable base material.

DESCRIPTION OF THE PREFERRED EMBODIMENTS

In the present specification, a numerical range shown using "to" indicates a range including the numerical values described before and after "to" as a minimum value and a maximum value, respectively.

In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in a certain numerical range may be replaced with a value described in an example.

In the present specification, in a case where a plurality of substances corresponding to respective components in a composition are present, the amount of the respective components in the composition indicates the total amount of the plurality of substances present in the composition unless otherwise specified.

In the present specification, a combination of two or more preferred embodiments is a more preferred embodiment.

In the present specification, the meaning of the term "step" includes not only an independent step but also a step whose intended purpose is achieved even in a case where the step is not clearly distinguished from other steps.

In the present specification, the term "image" denotes an entire film formed with an ink, and the term "image recording" denotes formation of an image (that is, the film).

Further, the concept of "image" in the present specification also includes a solid image.

In the present specification, the colored ink denotes an ink of a color other than white, and the color pigment denotes a pigment of a color other than white.

The concept of the colored ink also includes a black ink, and the concept of the color pigment also includes a black pigment.

In the present specification, the concept of "(meth)acrylate" includes both acrylate and methacrylate.

The concept of "(meth)acryl" includes both acryl and methacryl.

The concept of "alkylene glycol" includes both monoalkylene glycol and polyalkylene glycol.

The concept of "alkylene glycol alkyl ether" includes monoalkylene glycol monoalkyl ether, monoalkylene glycol polyalkyl ether, polyalkylene glycol monoalkyl ether, and polyalkylene glycol polyalkyl ether.

[Ink Jet Recording Method]

An ink jet recording method of the present disclosure (hereinafter, also simply referred to as "recording method") includes an ink applying step of applying an ink containing water onto an impermeable base material using an ink jet method, in which, in the ink applying step, the ink is applied onto the impermeable base material under a condition that a polarity of static electricity on a surface of the impermeable base material to which the ink is applied is opposite to a polarity of a zeta potential of the ink.

The recording method of the present disclosure may include other steps as necessary.

According to the recording method of the present disclosure, an image can be obtained by applying the ink containing water onto an impermeable base material. In the obtained image, degradation of the image quality due to a decrease in jet accuracy of the ink (that is, a decrease in the position accuracy of a point where the ink reaches the impermeable base material) and a shift of the jet timing of the ink (that is, a shift of the timing of the ink reaching the impermeable base material from the ideal timing) is suppressed.

The reason why a decrease in the jet accuracy of the ink is suppressed by the recording method according to the present disclosure is that since the polarity of static electricity of the surface of the impermeable base material to which the ink is applied is opposite to the polarity of the zeta potential of the ink, an attractive force is generated between the surface of the impermeable base material to which the ink is applied and the ink, the straightness of the ink is improved by the attractive force, and as a result, the jet accuracy of the ink is improved.

Further, the attractive force is also considered to contribute to the effect of suppressing the shift in the jet timing.

Hereinafter, each step of the recording method according to the present disclosure will be described.

<Ink Applying Step>

The ink applying step is a step of applying an ink containing water onto an impermeable base material by an ink jet method and is performed by applying the ink onto the impermeable base material under a condition that the polarity of static electricity on a surface of the impermeable base material to which the ink is applied is opposite to the polarity of the zeta potential of the ink.

(Impermeable Base Material)

In the ink applying step, the ink is applied onto the impermeable base material.

In the present disclosure, the impermeable base material denotes a base material having a water absorption rate (% by mass, 24 hours) of less than 0.2 in conformity with ASTM D570 of the ASTM test method.

The impermeable base material is not particularly limited, but a resin base material is preferable.

The resin base material is not particularly limited, and examples thereof include a thermoplastic resin base material.

Examples of the resin base material include a base material obtained by molding a thermoplastic resin in the form of a sheet or film.

As the resin base material, a base material containing polypropylene, polyethylene terephthalate, nylon, polyethylene, or polyimide is preferable.

The resin base material may be a transparent resin base material.

Here, the term "transparent" indicates that the transmittance of visible light having a wavelength of 400 nm to 700 nm is 80% or greater (preferably 90% or greater).

As in Example 201 described below, in an embodiment in which a colored ink having a hue other than white (preferably a chromatic color or black, for example, cyan, magenta, yellow, or black) and a white ink having a white hue are applied in this order onto the impermeable base material, a colored image having a white image as a background can be visually recognized through the impermeable base material from a side of an image non-recording surface (that is, a surface where an image has not been recorded) of the impermeable base material in a case where the impermeable base material is a transparent resin base material.

The resin base material may be colored.

The shape of the resin base material is not particularly limited, but a sheet-shaped resin base material is preferable. From the viewpoint of the productivity of a medium to be recorded, a sheet-shaped resin base material which is capable of forming a roll by being wound is more preferable.

The thickness of the resin base material is preferably in a range of 10 μm to 200 μm and more preferably in a range of 10 μm to 100 μm.

The resin base material may be subjected to a surface treatment from the viewpoint of improving the surface energy.

Examples of the surface treatment include a corona treatment, a plasma treatment, a heat treatment, an abrasion treatment, a light irradiation treatment (UV treatment), and a flame treatment, but the surface treatment is not limited thereto.

(Ink)

In the ink applying step, the ink containing water is applied onto the impermeable base material.

—Water—

The ink contains water.

The content of water is preferably 30% by mass or greater, preferably 40% by mass or greater, and still more preferably 50% by mass or greater with respect to the total amount of the ink.

The upper limit of the content of water depends on the amount of other components, but is preferably 90% by mass or less and more preferably 80% by mass or less with respect to the total amount of the ink.

—Pigment—

The ink contains at least one pigment.

The pigment is not particularly limited and may be an organic pigment or an inorganic pigment.

Examples of the organic pigment include an azo pigment, a polycyclic pigment (such as a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, or a quinophthalone pigment), a chelate dye, a nitro pigment, a nitroso pigment, and aniline black.

Examples of the inorganic pigment include a white inorganic pigment, iron oxide, barium yellow, cadmium red, chrome yellow, and carbon black. A preferred embodiment of the white inorganic pigment will be described below.

Examples of the pigment include pigments described in paragraphs 0096 to 0100 of JP2009-241586A.

The ink in the aspect of containing a chromatic pigment or a black pigment can be used as, for example, a colored ink (such as a cyan ink, a magenta ink, a yellow ink, or a black ink).

Further, the ink in the aspect of containing a white pigment (for example, a white inorganic pigment) can be used as, for example, a white ink (hereinafter, also referred to as "white ink").

Examples of the white inorganic pigment include titanium dioxide ($TiO_2$), barium sulfate, calcium carbonate, aluminum hydroxide, silica, zinc oxide, zinc sulfide, mica, talc, and pearl. Among the examples of the white inorganic pigment, titanium dioxide, barium sulfate, calcium carbonate, or zinc oxide is preferable, and titanium dioxide is more preferable.

The average primary particle diameter of the white inorganic pigment is, for example, in a range of 150 nm to 400 nm.

In a case where the average primary particle diameter thereof is 150 nm or greater, the covering property is further improved. Here, the covering property is a property of covering the ground with an image (for example, a white image).

Further, in a case where the average primary particle diameter thereof is 400 nm or less, the jettability of the ink is further improved.

The average primary particle diameter of the white inorganic pigment is preferably in a range of 250 nm to 350 nm and more preferably in a range of 250 nm to 300 nm.

The average primary particle diameter of the white inorganic pigment is a value measured using a transmission electron microscope (TEM). A transmission electron microscope 1200EX (manufactured by JEOL Ltd.) can be used for the measurement.

Specifically, the average primary particle diameter is defined as a value obtained by adding the ink diluted to 1,000 times dropwise to Cu200 mesh (manufactured by JEOL Ltd.) to which a carbon film has been attached, drying the ink, measuring the equivalent circle diameters of 300 independent particles that do not overlap each other in the image enlarged at a magnification of 100,000 times using a TEM, and simply averaging the measured values.

The content of the pigment is preferably in a range of 1% by mass to 20% by mass, more preferably in a range of 1% by mass to 15% by mass, and still more preferably in a range of 1% by mass to 10% by mass with respect to the total amount of the ink.

—Resin—

The ink can contain at least one resin.

The resin is not particularly limited, and preferred examples thereof include an acrylic resin, a polyester resin, a polyurethane resin, and a polyolefin resin.

The content of the resin is preferably in a range of 1% by mass to 30% by mass, more preferably in a range of 2% by mass to 20% by mass, still more preferably in a range of 2% by mass to 15% by mass, and even still more preferably in a range of 2% by mass to 10% by mass with respect to the total amount of the ink.

Specific examples of the resin include a pigment dispersing resin for dispersing the pigment and resin particles which are particles consisting of a resin.

—Pigment Dispersing Resin—

The resin can include a pigment dispersing resin as a pigment dispersing agent.

In a case where the resin includes the pigment dispersing resin, the ink contains a resin-coated pigment having a structure in which at least a part of the surface of the pigment is coated with the pigment dispersing resin.

A water-insoluble resin is preferable as the pigment dispersing resin.

An acrylic resin is preferable as the pigment dispersing resin.

Examples of the pigment dispersing resin include the pigment dispersing resins described in WO2013/180074A, JP5863600B, JP2018-28080A, JP2017-149906A, and JP2016-193981A. The pigment dispersing resin is also referred to as "resin dispersing agent" or the like.

Further, as a combination of the pigment and the pigment dispersing resin, for example, a resin-coated pigment coated with a pigment by a crosslinked water-soluble resin described in JP5404669B may be employed. The resin-coated pigment in this case can be prepared by, for example, using an acrylic resin containing a carboxy group as a water-soluble resin and a bifunctional or higher functional epoxy compound as a crosslinking agent.

From the viewpoint of the adsorptivity to the pigment, the pigment dispersing resin has preferably an alicyclic structure or an aromatic ring structure and more preferably an aromatic ring structure.

As the alicyclic structure, an alicyclic hydrocarbon structure having 5 to 10 carbon atoms is preferable, and a cyclohexane ring structure, a dicyclopentanyl ring structure, a dicyclopentenyl ring structure, a norbornane ring structure, an isobornane ring structure, a norbornene ring structure, an isobornene ring structure, or an adamantane ring structure is more preferable.

As the aromatic ring structure, a naphthalene ring or a benzene ring is preferable, and a benzene ring is more preferable.

The amount of the alicyclic structure or the aromatic ring structure is, for example, preferably in a range of 0.01 mol to 1.5 mol and more preferably in a range of 0.1 mol to 1 mol per 100 g of the resin contained in the resin particles.

From the viewpoint of the performance of dispersing the pigment, it is preferable that the pigment dispersing resin contains an ionic group in the structure.

The ionic group may be an anionic group or a cationic group, but an anionic group is preferable.

The anionic group is not particularly limited, but a carboxy group, a salt of the carboxy group, a sulfo group, or a salt of the sulfo group is preferable.

From the viewpoints of the pigment dispersibility and the storage stability, the acid value of the pigment dispersing resin is preferably in a range of 30 mgKOH/g to 300 mgKOH/g, more preferably in a range of 30 mgKOH/g to 200 mgKOH/g, and still more preferably in a range of 50 mgKOH/g to 200 mgKOH/g.

Here, the acid value is defined as the mass (mg) of KOH required to completely neutralize 1 g of a resin and is measured by the method described in JIS standard (JIS K 0070, 1992).

The weight-average molecular weight (Mw) of the pigment dispersing resin is preferably 30,000 or greater, more preferably in a range of 30,000 to 150,000, still more preferably in a range of 30,000 to 100,000, and even still more preferably in a range of 30,000 to 80,000.

In a case where the resin includes the pigment dispersing resin, the content of the pigment dispersing resin is preferably in a range of 1% by mass to 25% by mass, more preferably in a range of 1% by mass to 20% by mass, still more preferably in a range of 1% by mass to 15% by mass, and even still more preferably in a range of 1% by mass to 10% by mass with respect to the total amount of the ink.

In a case where the resin includes the pigment dispersing resin, the ratio of the pigment dispersing resin (D) to the pigment (P) (that is, the D/P ratio) is preferably in a range of 0.05 to 3, more preferably in a range of 0.05 to 2, still more preferably in a range of 0.05 to 1, and even still more preferably in a range of 0.05 to 0.7.

As a dispersion apparatus for dispersing the pigment, a known dispersion apparatus can be used, and examples thereof include a ball mill, a sand mill, a beads mill, a roll mill, a jet mill, a paint shaker, an attritor, an ultrasonic disperser, and a disper.

The form of the pigment dispersing resin is not particularly limited, and may be any of a random polymer, a block polymer, or a graft polymer or may be a polymer having a crosslinking structure.

It is preferable that the pigment dispersing resin is a polymer having a crosslinking structure or a block polymer.

Hereinafter, each of the preferable aspects of a polymer having a crosslinking structure or a block polymer as a preferable pigment dispersing resin will be described.

In the present disclosure, the polymer denotes a compound having a weight-average molecular weight of 1,000 or greater.

In the present disclosure, the weight-average molecular weight (Mw) denotes a value measured by gel permeation chromatography (GPC). The measurement according to gel permeation chromatography (GPC) is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofuran (THF) as an eluent. Further, the measurement is performed under measurement conditions of a sample concentration of 0.45% by mass, a flow rate of 0.35 ml/min, a sample injection volume of 10 μl, and a measurement temperature of 40° C. using an RI detector. Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

—Polymer Having Crosslinking Structure—

The polymer having a crosslinking structure is not particularly limited as long as the polymer is a polymer having at least one crosslinking structure in a molecule.

Whether or not the polymer contained in the ink has a crosslinking structure can be determined, for example, by the following method. First, the polymer is separated from the ink by a separation method such as solvent extraction. The presence or absence of the crosslinking structure can be comprehensively determined by analyzing the separated polymer using various analysis methods such as a nuclear magnetic resonance method (NMR), an infrared spectroscopy method (IR), and a thermal analysis method.

The polymer having a crosslinking structure (hereinafter, also referred to as "crosslinked polymer") is formed, for example, by crosslinking an uncrosslinked polymer (hereinafter, also referred to as "uncrosslinked polymer") with a crosslinking agent. It is preferable that the uncrosslinked polymer is a water-soluble polymer.

In the present disclosure, the term "water-soluble" indicates a property in which 1 g or greater of a substance is dissolved in 100 g of water at 25° C. As the term "water-soluble" property, a property in which 3 g or greater (more preferably 10 g or greater) of a substance is dissolved in 100 g of water at 25° C. is preferable.

Even in a case where the uncrosslinked polymer is water-soluble, the crosslinked polymer is not necessarily water-soluble.

Examples of the uncrosslinked polymer include a vinyl resin, an acrylic resin, a urethane resin, and a polyester resin. Among these, an acrylic resin is preferable as the uncrosslinked polymer.

It is preferable that the uncrosslinked polymer is a polymer containing a functional group that can be crosslinked by a crosslinking agent. Examples of the crosslinkable functional group include a carboxy group or a salt thereof, an isocyanate group, and an epoxy group. Among these, from the viewpoint of improving the dispersibility of the pigment, a carboxy group or a salt thereof is preferable, and a carboxy group is particularly preferable as the crosslinkable functional group. That is, a polymer containing a carboxy group is preferable as the uncrosslinked polymer.

It is preferable that the uncrosslinked polymer is a copolymer having a structural unit derived from a monomer containing a carboxy group (hereinafter, referred to as “carboxy group-containing monomer”). The structural unit derived from a carboxy group-containing monomer contained in a copolymer may be used alone or two or more kinds thereof. The copolymer may be a random copolymer or a block copolymer, but is preferably a random copolymer.

Examples of the carboxy group-containing monomer include (meth)acrylic acid, β-carboxyethyl acrylate, fumaric acid, itaconic acid, maleic acid, and crotonic acid.

From the viewpoints of the crosslinking properties and the dispersibility, (meth)acrylic acid or β-carboxyethyl acrylate is preferable, and (meth)acrylic acid is more preferable as the carboxy group-containing monomer.

The content of the structural unit derived from a carboxy group-containing monomer is preferably in a range of 5% by mass to 40% by mass, more preferably in a range of 10% by mass to 35% by mass, and still more preferably in a range of 10% by mass to 30% by mass with respect to the total amount of the uncrosslinked polymer.

It is preferable that the uncrosslinked polymer has a structural unit derived from a hydrophobic monomer in addition to the structural unit derived from a carboxy group-containing monomer. The structural unit derived from a hydrophobic monomer contained in the copolymer may be used alone or two or more kinds thereof.

Examples of the hydrophobic monomer include (meth) acrylate containing an alkyl group having 1 to 20 carbon atoms, (meth)acrylate having an aromatic ring (such as benzyl (meth)acrylate or phenoxyethyl (meth)acrylate), styrene, and a styrene derivative.

The content of the structural unit derived from a hydrophobic monomer is preferably in a range of 60% by mass to 95% by mass, more preferably in a range of 65% by mass to 90% by mass, and still more preferably in a range of 70% by mass to 90% by mass with respect to the total amount of the uncrosslinked polymer.

The uncrosslinked polymer is preferably a random copolymer having a structural unit derived from a carboxy group-containing monomer and at least one of a structural unit derived from a (meth)acrylate containing an alkyl group having 1 to 20 carbon atoms or a structural unit derived from a (meth)acrylate having an aromatic ring, more preferably a random copolymer having a structural unit derived from (meth)acrylic acid and a structural unit derived from a (meth)acrylate having an aromatic ring, and still more preferably a copolymer having a structural unit derived from (meth)acrylic acid and a structural unit derived from benzyl (meth)acrylate.

The weight-average molecular weight (Mw) of the uncrosslinked polymer is not particularly limited, but is preferably in a range of 3,000 to 300,000, more preferably in a range of 5,000 to 200,000, and still more preferably in a range of 7,000 to 100,000 from the viewpoint of the dispersibility of the white pigment.

The preferable ranges of the weight-average molecular weight of the crosslinked polymer are the same as the preferable ranges of the weight-average molecular weight of the uncrosslinked polymer.

It is preferable that the crosslinking agent used in a case of crosslinking the uncrosslinked polymer is a compound having two or more reaction sites with the uncrosslinked polymer (for example, a polymer containing a carboxy group). The crosslinking agent may be used alone or in combination of two or more kinds thereof.

As a combination of the crosslinking agent and the uncrosslinked polymer, a combination of a compound containing two or more epoxy groups (that is, a bi- or higher functional epoxy compound) and a polymer containing a carboxy group is preferable. In this combination, a crosslinking structure is formed by the reaction between the epoxy group and the carboxy group. It is preferable that the crosslinking structure is formed by the crosslinking agent after the pigment is dispersed by the uncrosslinked polymer.

Examples of the bi- or higher functional epoxy compound include ethylene glycol diglycidyl ether, polyethylene glycol diglycidyl ether, 1,6-hexanediol diglycidyl ether, diethylene glycol diglycidyl ether, dipropylene glycol diglycidyl ether, polypropylene glycol diglycidyl ether, and trimethylolpropane triglycidyl ether.

Among these, polyethylene glycol diglycidyl ether, diethylene glycol diglycidyl ether, or trimethylolpropane triglycidyl ether is preferable as the bi- or higher functional epoxy compound.

Commercially available products may be used as the crosslinking agent.

Examples of the commercially available products include Denacol EX-321, EX-821, EX-830, EX-850, and EX-851 (manufactured by Nagase ChemteX Corporation).

From the viewpoints of the crosslinking reaction rate and the dispersion stability after crosslinking, the molar ratio between a reaction site (for example, an epoxy group) in the crosslinking agent and a reaction site (for example, a carboxy group) in the uncrosslinked polymer is preferably in a range of 1:1.1 to 1:10, more preferably in a range of 1:1.1 to 1:5, and still more preferably in a range of 1:1.1 to 1:3.

—Block Polymer—

The block polymer is also referred to as a block copolymer, and is a copolymer in which at least two polymers are bonded to each other in a molecule.

It is preferable that the block polymer has a structural unit derived from a hydrophobic monomer and a structural unit derived from a monomer containing an anionic group (hereinafter, referred to as “anionic group-containing monomer”).

The structural unit derived from a hydrophobic monomer contained in the block polymer may be used alone or two or more kinds thereof. The structural unit derived from an anionic group-containing monomer contained in the block polymer may be used alone or two or more kinds thereof.

Examples of the structural unit derived from a hydrophobic monomer include an ethylenically unsaturated compound having an aromatic ring structure or an alicyclic structure and a (meth)acrylate containing an alkyl group having 1 to 20 carbon atoms.

The content of the structural unit derived from a hydrophobic monomer is preferably in a range of 35% by mass to 95% by mass, more preferably in a range of 50% by mass to 95% by mass, and still more preferably in a range of 70% by mass to 90% by mass with respect to the total amount of the block polymer.

From the viewpoint of the adsorptivity to the pigment, the hydrophobic monomer contains preferably an ethylenically unsaturated compound having an aromatic ring structure or an alicyclic structure, more preferably an ethylenically unsaturated compound having an alicyclic structure, and still more preferably an ethylenically unsaturated compound having an alicyclic structure having 6 or more carbon atoms.

The content of the structural unit derived from the ethylenically unsaturated compound having an aromatic ring structure or an alicyclic structure is preferably in a range of 10% by mass to 90% by mass, more preferably in a range of 20% by mass to 80% by mass, still more preferably in a range of 30% by mass to 70% by mass, and even still more preferably in a range of 30% by mass to 60% by mass with respect to the total amount of the block polymer.

It is also preferable that the structural unit derived from the hydrophobic monomer contains a (meth)acrylate containing an alkyl group having 1 to 20 carbon atoms. The alkyl group may be any of linear or branched.

Examples of the (meth)acrylate containing an alkyl group having 1 to 20 carbon atoms include methyl (meth)acrylate, ethyl (meth)acrylate, n-propyl (meth)acrylate, n-butyl (meth)acrylate, 2-ethylhexyl (meth)acrylate, and octyl (meth)acrylate.

The content of the structural unit derived from a (meth) acrylate containing an alkyl group having 1 to 20 carbon atoms is preferably in a range of 10% by mass to 90% by mass, more preferably in a range of 20% by mass to 80% by mass, still more preferably in a range of 30% by mass to 70% by mass, and particularly preferably in a range of 40% by mass to 60% by mass with respect to the total amount of the block polymer.

Examples of the anionic group in the structural unit derived from an anionic group-containing monomer include a carboxy group, a salt of the carboxy group, a sulfo group, a salt of the sulfo group, a phosphoric acid group, a salt of the phosphoric acid group, a phosphonic acid group, and a salt of the phosphonic acid group.

Examples of the counterion in a salt include an alkali metal ion such as a sodium ion, a potassium ion, or a lithium ion, an alkaline earth metal ion such as a calcium ion or a magnesium ion, and an ammonium ion.

Among these, a carboxy group or a salt of the carboxy group is preferable as the anionic group. Examples of the anionic group-containing monomer include (meth)acrylic acid, β-carboxyethyl acrylate, fumaric acid, itaconic acid, maleic acid, and crotonic acid. Among these, (meth)acrylic acid is preferable as the anionic group-containing monomer.

The content of the structural unit derived from the anionic group-containing monomer is preferably in a range of 1% by mass to 30% by mass, more preferably in a range of 2% by mass to 25% by mass, and still more preferably in a range of 3% by mass to 20% by mass with respect to the total amount of the block polymer.

Whether or not the polymer contained in the ink is a block polymer can be determined by, for example, the following method. First, the polymer is separated from the ink by a separation method such as solvent extraction. The physical properties such as the glass transition temperature are measured by performing analysis on the separated polymer using various analysis methods such as a nuclear magnetic resonance method (NMR), an infrared spectroscopy method (IR), and a thermal analysis method, and thus it is possible to comprehensively determine whether or not the polymer is a block polymer.

The weight-average molecular weight (Mw) of the block polymer is not particularly limited, but is preferably in a range of 3,000 to 100,000, more preferably in a range of 5,000 to 80,000, and still more preferably in a range of 10,000 to 60,000 from the viewpoint of the dispersibility of the pigment.

—Resin Particles—

The resin may contain resin particles.

Here, the resin particles are distinguished from the pigment dispersing resin described above in terms that the particles consist of a resin.

A water-insoluble resin is preferable as the resin constituting the resin particles.

The glass transition temperature of the resin particles (that is, the glass transition temperature of the resin in the resin particles) is not particularly limited.

From the viewpoint of further improving the strength of the image, the glass transition temperature (Tg) of the resin particles is preferably 20° C. or higher, more preferably 50° C. or higher, and still more preferably 80° C. or higher.

From the viewpoint of the manufacturing suitability of the resin particles, the glass transition temperature (Tg) of the resin particles is preferably 150° C. or lower and more preferably 130° C. or lower.

Preferred examples of the resin particles include particles consisting of an acrylic resin (hereinafter, also referred to as acrylic resin particles), particles consisting of a styrene acrylic resin (hereinafter, also referred to as styrene acrylic resin particles), particles consisting of a polyester resin (hereinafter, also referred to as polyester resin particles), particles consisting of a polyurethane resin (hereinafter, also referred to as polyurethane resin particles), and particles consisting of a polyolefin resin (hereinafter, also referred to as polyolefin resin particles).

As the resin particles, self-dispersing resin particles are preferable.

Examples of the self-dispersing resin particles include self-dispersing polymer particles described in paragraphs 0062 to 0076 of JP2016-188345A and paragraphs 0109 to 0140 of WO2013/180074A.

The molecular weight of the resin in the resin particles is preferably in a range of 1000 to 300000, more preferably in a range of 2,000 to 200,000, and still more preferably in a range of 5,000 to 100,000 in terms of the weight-average molecular weight.

The weight-average molecular weight is measured by gel permeation chromatography (GPC). The details of GPC are as described above.

The volume average particle diameter of the resin particles is preferably in a range of 1 nm to 200 nm, more preferably in a range of 3 nm to 200 nm, and still more preferably in a range of 5 nm to 50 nm.

In a case where the ink contains resin particles, the content of the resin particles is preferably in a range of 1% by mass to 25% by mass, more preferably in a range of 2% by mass to 20% by mass, still more preferably in a range of 2% by mass to 15% by mass, and even still more preferably in a range of 2% by mass to 10% by mass with respect to the total amount of the ink.

—Water-Soluble Organic Solvent Having Boiling Point of Lower than 220° C.—

It is preferable that the ink contains at least one water-soluble organic solvent having a boiling point of lower than 220° C.

In this manner, the lamination strength of the image recorded material is further improved.

In the present disclosure, the boiling point is a boiling point at 1 atm (101325 Pa).

Examples of the water-soluble organic solvent having a boiling point of lower than 220° C. include 1,2-propanediol (also referred to as propylene glycol) (boiling point of 188° C.), 1,3-propanediol (boiling point of 213° C.), propylene glycol monomethyl ether (boiling point of 121° C.), ethylene glycol (boiling point of 197° C.), ethylene glycol monomethyl ether (boiling point of 124° C.), propylene glycol monoethyl ether (boiling point of 133° C.), ethylene glycol monoethyl ether (boiling point of 135° C.), propylene glycol monopropyl ether (boiling point of 149° C.), ethylene glycol monopropyl ether (boiling point of 151° C.), propylene glycol monobutyl ether (boiling point of 170° C.), ethylene glycol monobutyl ether (boiling point of 171° C.), 2-ethyl-1-hexanol (boiling point of 187° C.), dipropylene glycol monomethyl ether (boiling point of 188° C.), diethylene glycol dimethyl ether (boiling point of 162° C.), diethylene glycol diethyl ether (boiling point of 188° C.), and dipropylene glycol dimethyl ether (boiling point of 175° C.).

In a case where the ink contains a water-soluble organic solvent having a boiling point of lower than 220° C., the content of the water-soluble organic solvent having a boiling point of lower than 220° C. is preferably in a range of 1% by mass to 50% by mass, more preferably in a range of 5% by mass to 40% by mass, still more preferably in a range of 10% by mass to 40% by mass, and even still more preferably in a range of 15% by mass to 35% by mass with respect to the total amount of the ink.

—Organic Solvent Having Boiling Point 220° C. or Higher—

The content of the organic solvent having a boiling point of 220° C. or higher (hereinafter, also referred to as "high-boiling point solvent") in the ink is preferably 5% by mass or less. In this manner, the lamination strength of the image recorded material and the adhesiveness of the image are further improved.

Here, "the content of the organic solvent having a boiling point of 220° C. or higher in the ink is 5% by mass or less" denotes that the ink does not contain the organic solvent having a boiling point of 220° C. or higher (that is, the content of the organic solvent having a boiling point of 220° C. or higher in the ink is 0% by mass) or even in a case where the ink contains the organic solvent having a boiling point of 220° C. or higher, the content of the organic solvent having a boiling point of 220° C. or higher is 5% by mass or less with respect to the total amount of the ink.

The content of the organic solvent having a boiling point of 220° C. or higher in the ink is more preferably 3% by mass or less, still more preferably 2% by mass or less, even still more preferably 1% by mass or less, and even still more preferably 0% by mass.

Examples of the organic solvent having a boiling point of 220° C. or higher include glycerin (boiling point of 290° C.), 1,2-hexanediol (HDO) (boiling point of 223° C.), diethylene glycol (boiling point of 245° C.), diethylene glycol monobutyl ether (boiling point of 230° C.), triethylene glycol (boiling point of 285° C.), dipropylene glycol (boiling point of 232° C.), tripropylene glycol (boiling point 267° C.), trimethylolpropane (boiling point of 295° C.), 2-pyrrolidone (boiling point of 245° C.), tripropylene glycol monomethyl ether (boiling point of 243° C.), and triethylene glycol monomethyl ether (boiling point of 248° C.).

—Surfactant—

The ink may contain at least one kind of surfactant.

Examples of the surfactant include a nonionic surfactant, a cationic surfactant, an anionic surfactant, and a betaine surfactant.

Preferred examples of the surfactant include an acetylene glycol-based surfactant, which is a kind of a nonionic surfactant.

As the acetylene glycol-based surfactant, for example, the acetylene glycol-based surfactants described in paragraphs 0070 to 0080 of WO2017/149917A can be used.

Examples of the acetylene glycol-based surfactant include a polyalkylene oxide adduct (preferably a polyethylene oxide adduct) of 2,4,7,9-tetramethyl-5-decyne-4,7-diol, a polyalkylene oxide adduct (preferably a polyethylene oxide adduct) of 3,6-dimethyl-4-octyne-3,6-diol, a polyalkylene oxide adduct (preferably a polyethylene oxide adduct) of 2,5,8,11-tetramethyl-6-dodecyne-5,8-diol, and a polyalkylene oxide adduct (preferably a polyethylene oxide adduct) of 2,5-dimethyl-3-hexyne-2,5-diol.

Examples of commercially available products of the acetylene glycol-based surfactant include the SURFYNOL Series (such as SURFYNOL 420, SURFYNOL 440, SURFYNOL 465, and SURFYNOL 485), OLFINE Series (such as OLFINE E1010 and OLFINE E1020), and DYNOL Series (such as DYNOL 604) (all manufactured by Air Products and Chemicals Inc. or Nissin Chemical Co., Ltd.), and ACETYLENOL (manufactured by Kawaken Fine Chemicals Co., Ltd.).

Commercially available products of the acetylene glycol-based surfactants are also provided by The Dow Chemical Company, General Aniline & Film Corporation, and the like.

Examples of the surfactant include compounds exemplified as surfactants in pp. 37 and 38 of JP1984-157636A (JP-S59-157636A) and Research Disclosure No. 308119 (1989). Further, other examples of the surfactant include fluorine-based (fluorinated alkyl-based) surfactants and silicone-based surfactants described in JP2003-322926A, JP2004-325707A, and JP2004-309806A.

In a case where the ink contains a surfactant, the content of the surfactant in the ink is appropriately adjusted in consideration of the surface tension of the ink.

The content of the surfactant in the ink is preferably in a range of 0.01% by mass to 5% by mass, more preferably in a range of 0.05% by mass to 3% by mass, and still more preferably in a range of 0.1% by mass to 2% by mass with respect to the total amount of the ink.

—Other Components—

The ink may contain components other than the components described above.

Examples of other components include known additives such as a silicic acid compound (such as silicic acid compounds described in paragraphs 0058 to 0075 of JP5430316B), urea, a urea derivative, a wax, a fading inhibitor, an emulsion stabilizer, a penetration enhancer, an ultraviolet absorbing agent, a preservative, a fungicide, a pH adjuster, an antifoaming agent, a viscosity adjuster, a dispersion stabilizer, and a chelating agent.

—Preferable Physical Properties of Ink—

The viscosity (25° C.) of the ink is preferably 1.2 mPa·s or greater and 15.0 mPa·s or less, more preferably 2 mPa·s or greater and less than 13 mPa·s, and still more preferably 2.5 mPa·s or greater and less than 10 mPa·s.

The surface tension (25° C.) of the ink is preferably in a range of 25 mN/m to 50 mN/m, more preferably in a range of 30 mN/m to 45 mN/m, and still more preferably in a range of 30 mN/m to 40 mN/m.

The pH of the ink at 25° C. is preferably in a range of 6 to 11, more preferably in a range of 7 to 10, and still more preferably in a range of 7 to 9.

The pH of the ink at 25° C. is measured using a commercially available pH meter.

(Application of Ink)

In the ink applying step, the ink is applied onto the impermeable base material by an ink jet method (that is, the ink is jetted from an ink jet head).

The method of jetting the ink in the ink jet method is not particularly limited, and any of known methods such as an electric charge control method of jetting an ink using electrostatic attraction force; a drop-on-demand method (pressure pulse method) using a vibration pressure of a piezoelectric element; an acoustic ink jet method of allowing an ink to be jetted using a radiation pressure by converting an electric signal into an acoustic beam and irradiating the ink with the acoustic beam; and a thermal ink jet (bubble jet (registered trademark)) method of heating an ink to form air bubbles and utilizing the generated pressure may be used.

As an ink jet method, particularly, an ink jet method, described in JP1979-59936A (JP-S54-59936A), of jetting an ink from a nozzle using an action force caused by a rapid change in volume of the ink after being subjected to an action of thermal energy can be effectively used.

Further, as the ink jet method, the method described in paragraphs 0093 to 0105 of JP2003-306623A can also be employed.

The application of the ink according to the ink jet method is performed by allowing a nozzle of an ink jet head to jet the ink.

Examples of the system of the ink jet head include a shuttle system of performing recording while scanning a short serial head in the width direction of a medium to be recorded and a line system of using a line head in which recording elements are aligned in correspondence with the entire area of one side of a medium to be recorded.

In the line system, image recording can be performed on the entire surface of the medium to be recorded by scanning the medium to be recorded in a direction intersecting the direction in which the recording elements are aligned. In the line system, a transport system such as a carriage that scans a short head in the shuttle system is not necessary. Further, in the line system, since movement of a carriage and complicated scanning control between the short head and the recorded medium are not necessary as compared with the shuttle system, only the recorded medium moves. Therefore, according to the line system, image recording at a higher speed than that of the shuttle system can be realized.

It is preferable to apply the ink using an ink jet head having a resolution of 300 dpi or greater (more preferably 600 dpi and still more preferably 800 dpi). Here, dpi stands for dot per inch, and 1 inch is 2.54 cm.

From the viewpoint of obtaining a high-definition image, the liquid droplet amount of the ink to be jetted from the nozzle of the ink jet head is preferably in a range of 1 pL (picoliter) to 10 pL and more preferably in a range of 1.5 pL to 6 pL.

Further, from the viewpoints of improving the image unevenness and improving connection of continuous gradations, it is also effective that the ink is jetted by combining different liquid droplet amounts.

The recording method of the present disclosure may include a step of preheating the impermeable base material before the ink applying step. In this case, the ink is applied onto the preheated impermeable base material in the ink applying step.

The heating temperature of the preheating may be appropriately set, but the temperature of the impermeable base material is set to be preferably in a range of 20° C. to 50° C. and more preferably in a range of 25° C. to 40° C.

In the ink applying step, two or more kinds of inks may be applied onto the impermeable base material.

As the two or more kinds of inks, inks of two or more colors are preferable, two or more kinds of inks selected from the group consisting of at least one colored ink and at least one white ink are more preferable, and two or more kinds of inks used in a combination of at least one colored ink and at least one white ink are still more preferable.

In the present disclosure, the colored ink denotes an ink having a hue (for example, a chromatic color or black) other than white (for example, a cyan ink, a magenta ink, a yellow ink, or a black ink).

In a case where inks of two or more colors are sequentially applied onto the impermeable base material in the ink applying step, the ink of the n-th color (n represents an integer of 1 or greater, the same applies hereinafter) which has been applied onto the impermeable base material is heated and dried and the ink of the (n+1)-th color may be applied onto the heated and dried ink of the n-th color, or the ink of the (n+1)-th color may be applied onto the ink of the n-th color without heating or drying the ink of the n-th color which has been applied onto the impermeable base material.

(Static Electricity of Impermeable Base Material and Zeta Potential of Ink)

The ink applying step is performed by applying the ink onto the impermeable base material under a condition that the polarity of the static electricity on the surface of the impermeable base material to which the ink is applied is opposite to the polarity of the zeta potential of the ink.

The combination of the polarity of the static electricity and the polarity of the zeta potential may be a combination in which the polarity of the static electricity is positive (+) and the polarity of the zeta potential is negative (−) or a combination in which the polarity of the static electricity is negative (−) and the polarity of the zeta potential is positive (+), but a combination in which the polarity of the static electricity is positive (+) and the polarity of the zeta potential is negative (−) is preferable from the viewpoint of further suppressing degradation of the image quality of an image.

From the viewpoint of further suppressing degradation of the image quality of an image, it is preferable that the ink applying step is performed by applying the ink onto the impermeable base material under a condition that in a case where the amount of the static electricity on the surface of the impermeable base material to which the ink is applied is defined as A kV and the zeta potential of the ink is defined as B mV, a difference [A−B] which is a value obtained by subtracting B from A is in a range of 30 to 110 (that is, in a range of +30 to +110).

In a case where the difference [A−B] is 30 or greater, degradation of the image quality particularly due to a decrease in the jet accuracy of the ink is further suppressed. From the viewpoint of such an effect, the difference [A−B] is more preferably 40 or greater and still more preferably 45 or greater.

In a case where the difference [A−B] is 110 or less, degradation of the image quality particularly due to the shift of the jet timing of the ink is further suppressed. From a viewpoint of such an effect, the difference [A−B] is more preferably 90 or less and still more preferably 70 or less.

From the viewpoint of further suppressing degradation of the image quality of the image, it is preferable that the ink applying step is performed by applying the ink onto the impermeable base material under a condition that the difference [A−B] is in a range of 45 to 70.

The zeta potential ("B" (unit: mV)) of the ink is preferably in a range of −80 mV to −10 mV, more preferably in a range of −80 mV to −20 mV, and still more preferably in a range of −80 mV to −30 mV.

In a case where the zeta potential of the ink is −80 mV or greater, adjustment of the difference [A−B] to 110 or less is more likely to be achieved.

In a case where the zeta potential of the ink is −20 mV or less, adjustment of the difference [A−B] to 30 or greater is more likely to be achieved.

The zeta potential of the ink can be adjusted by adjusting the kind of components contained in the ink, the composition of the ink, and the like.

The zeta potential of the ink can be adjusted by adjusting, for example, the acid value and/or the degree of neutralization of a pigment dispersing agent contained in the ink as necessary, the acid value and/or the degree of neutralization of resin particles contained in the ink as necessary, the acid value and/or the degree of neutralization of a water-soluble resin contained in the ink as necessary, and the like.

In the present disclosure, the zeta potential of the ink denotes a value measured using ZETASIZER NANO-ZS (manufactured by Malvern Panalytical).

Specifically, the zeta potential of the ink according to the present disclosure is measured using ZETASIZER NANO-ZS by diluting the ink to 1000 times with ultrapure water, shaking the diluted ink for 30 seconds using a shaker.

The amount of the static electricity ("A" (unit: kV)) on the surface of the impermeable base material to which the ink is applied is preferably in a range of 0 kV to 50 kV (that is, in a range of 0 kV to +50 kV), more preferably in a range of 5 kV to 40 kV, and still more preferably in a range of 10 kV to 30 kV.

In a case where the amount of the static electricity on the surface of the impermeable base material to which the ink is applied is 0 kV or greater, adjustment of the difference [A−B] to 30 or greater is more likely to be achieved.

In a case where the amount of the static electricity on the surface of the impermeable base material to which the ink is applied is 50 kV or less, adjustment of the difference [A−B] to 110 or less is more likely to be achieved.

In the present disclosure, the amount of the static electricity on the surface of the impermeable base material to which the ink is applied denotes a value measured using a static electricity measuring instrument SK-H050 (manufactured by KEYENCE Corporation).

Specifically, the amount of a charged potential at a position spaced by a distance of 10 cm from the surface of the impermeable base material to which the ink is applied is measured in a Far mode (wide range mode) using the above-described static electricity measuring instrument, and the amount of the obtained charged potential is defined as the amount of the static electricity on the surface of the impermeable base material to which the ink is applied.

The amount of the static electricity on the surface of the impermeable base material to which the ink is applied can be adjusted, for example, by an ionizer, a destaticizing brush, a destaticizing sheet, or the like.

(Heating and Drying Ink)

In the ink applying step, the ink applied onto the impermeable base material may be heated and dried.

Examples of the means for heating and drying the ink include known heating means such as an infrared heater, known air blowing means such as a dryer, and means for combining two or more of these means.

Examples of the method of heating and drying the ink include a method of applying warm air or hot air to the surface of the impermeable base material onto which the ink has been applied; a method of applying heat using an infrared heater or the like from the surface of the impermeable base material onto which the ink has been applied and/or from a side of the impermeable base material opposite to the surface onto which the ink has been applied; and a method of combining a plurality of these methods.

The heating temperature of heating and drying the ink is preferably 55° C. or higher, more preferably 60° C. or higher, and particularly preferably 65° C. or higher. The upper limit of the heating temperature is not particularly limited, and the upper limit thereof may be 100° C. and preferably 90° C.

The time of heating and drying the ink is not particularly limited, but is preferably in a range of 3 seconds to 60 seconds, more preferably in a range of 5 seconds to 30 seconds, and particularly preferably in a range of 5 seconds to 20 seconds.

<Aspect of Using Ink Set>

In the recording method according to the present disclosure, two or more kinds of ink sets containing water may be used.

For example, in the recording method according to the present disclosure, an ink set including at least one colored ink containing water and a color pigment (hereinafter, also simply referred to as "colored ink") and at least one white ink containing water and a white pigment (hereinafter, also simply referred to as "white ink") may be used.

The ink set including the colored ink and the white ink may further include the pretreatment liquid described by example in detail below.

In the recording method of the present disclosure, in a case where the ink set including the colored ink and the white ink is used, the ink applying step is performed by applying each of the colored ink and the white ink onto the identical surface of the impermeable base material using an ink jet method in a state where Condition a1, Condition a2, and Condition a3 are satisfied.

Condition a1: The polarities of the zeta potentials of all the inks which are the at least one colored ink and the at least one white ink are the same as each other.

Condition a2: The polarity of the static electricity on the identical surface of the impermeable base material is opposite to the polarities of the zeta potentials of all the inks.

Condition a3: In a case where the amount of the static electricity on the identical surface of the impermeable base material is defined as A kV and the zeta potential of each of the at least one colored ink and the at least one white ink is defined as B mV, a difference [A−B] which is a value obtained by subtracting B from A is in a range of 30 to 110 in all the inks.

In the recording method of the present disclosure, in a case where the ink set including the colored ink and the white ink is used, an image derived from these inks can be obtained. In this case, a decrease in jet accuracy and a shift of the jet timing of each of these inks are suppressed. As a result, degradation of the image quality (for example, occurrence of streaks) due to a decrease in jet accuracy and a shift of the jet timing is suppressed in the obtained image.

In the recording method according to the present disclosure, in a case where the ink set including the colored ink and the white ink is used, it is preferable that the difference [A−B] for the ink to be applied last is greatest among the differences [A−B] for each of the colored ink and the white ink.

In this manner, degradation of the image quality (for example, occurrence of streaks) due to a decrease in jet accuracy and a shift of the jet timing of the ink is more effectively suppressed in the obtained image.

The reason why such an effect can be obtained is considered that the influence of the jet accuracy and the jet timing of the ink to be applied last on the image quality of the obtained image is greatest.

In the recording method according to the present disclosure, in a case where the ink set including the colored ink and the white ink is used and n represents an integer of 2 or greater, it is preferable that the difference [A−B] for the n-th ink in application order is greater than or equal to the difference [A−B] for the n−1-th ink in application order and that the difference [A−B] for the ink to be applied last is greater than the difference [A−B] for the ink to be applied first.

In this manner, degradation of the image quality (for example, occurrence of streaks) due to a decrease in jet accuracy and a shift of the jet timing of the ink is more effectively suppressed in the obtained image.

The reason why such an effect can be obtained is considered that the influence of the ink on the image quality of the obtained image increases as the application order of the ink progresses.

In the recording method according to the present disclosure, in a case where the ink set including the colored ink and the white ink is used, for example, the colored ink and the white ink are applied in this order in the ink applying step. That is, the white ink is applied last.

In the embodiment, for example, a colored image (that is, a chromatic color image or a black image; for example, a pattern image such as characters or figures) formed with the colored ink is recorded on the impermeable base material using a base material having transparency as the impermeable base material, and a white image (for example, a solid image) formed with the white ink is recorded on the impermeable base material on which the colored image has been recorded such that the colored image is covered with the white image. In this case, in a case where observation is made from a side of an image non-recorded surface (that is, the surface on which the image has not been recorded) of the impermeable base material, the colored image having the white image as a background image can be visually recognized through the impermeable base material. Meanwhile, in a case where observation is made from a side of an image recorded surface (that is, the surface on which the image has been recorded) of the impermeable base material, the colored image and the impermeable base material are covered by the white image formed with the white ink, and thus the colored image and the impermeable base material are unlikely to be visually recognized.

<Pretreatment Liquid Applying Step>

The recording method according to the present disclosure may further include a pretreatment liquid applying step of applying a pretreatment liquid that contains water and an aggregating agent onto the impermeable base material before the ink applying step.

In this case, the ink applying step is performed by applying the ink onto a region of the impermeable base material to which the pretreatment liquid has been applied.

According to the aspect, an image with an excellent image quality can be obtained by aggregating the components in the ink with the aggregating agent.

In a case where the recording method according to the present disclosure includes the pretreatment liquid applying step, the static electricity and the amount of the static electricity on "the surface of the impermeable base material to which the ink is applied" in the ink applying step denote the static electricity and the amount of the static electricity of the region of the impermeable base material to which the pretreatment liquid has been applied.

(Pretreatment Liquid)

The pretreatment liquid contains water and an aggregating agent.

—Water—

The pretreatment liquid contains water.

The content of water is preferably 50% by mass or greater and more preferably 60% by mass or greater with respect to the total amount of the pretreatment liquid.

The upper limit of the content of water depends on the amount of other components, but is preferably 90% by mass or less with respect to the total amount of the pretreatment liquid.

—Aggregating Agent—

A pretreatment liquid containing at least one aggregating agent selected from the group consisting of an organic acid, an organic acid salt, a polyvalent metal compound, and a metal complex is prepared as the pretreatment liquid.

The aggregating agent is a component that aggregates components (for example, a resin) of the ink.

—Organic Acid—

As the organic acid, an organic compound containing an acidic group is exemplified.

Examples of the acidic group include a phosphoric acid group, a phosphonic acid group, a phosphinic acid group, a sulfuric acid group, a sulfonic acid group, a sulfinic acid group, and a carboxy group.

From the viewpoint of the aggregation rate of the ink, a phosphoric acid group or a carboxy group is preferable, and a carboxy group is more preferable as the acidic group.

Further, it is preferable that at least a part of the acidic group is dissociated in the pretreatment liquid.

Preferred examples of the organic compound containing a carboxy group include polyacrylic acid, acetic acid, formic acid, benzoic acid, glycolic acid, malonic acid, malic acid (preferably DL-malic acid), maleic acid, succinic acid, glutaric acid, fumaric acid, citric acid, tartaric acid, phthalic acid, adipic acid, pimelic acid, 4-methylphthalic acid, lactic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and pimelic acid. These compounds may be used alone or in combination of two or more kinds thereof.

From the viewpoint of the aggregation rate of the ink, as the organic compound containing a carboxy group, a di- or higher valent carboxylic acid (hereinafter, also referred to as a polyvalent carboxylic acid) is preferable.

As the polyvalent carboxylic acid, a dicarboxylic acid or a tricarboxylic acid is preferable, glutaric acid, malonic acid, succinic acid, adipic acid, pimelic acid, malic acid, maleic acid, fumaric acid, tartaric acid, or citric acid is more preferable, glutaric acid, malonic acid, succinic acid, adipic acid, pimelic acid, malic acid, fumaric acid, tartaric acid, or citric acid is still more preferable, and glutaric acid, malonic acid, succinic acid, adipic acid, or pimelic acid is even still more preferable.

It is preferable that the organic acid has a low pKa (for example, 1.0 to 5.0).

In this manner, the surface charge of particles such as polymer particles or the pigment stably dispersed in the ink by a weakly acidic functional group such as a carboxy group is reduced by bringing the ink into contact with an organic acidic compound having a lower pKa to degrade the dispersion stability.

It is preferable that the organic acid has a low pKa and a high solubility in water and is di- or higher valent and more preferable that the organic acid is a di- or trivalent acidic substance which has a high buffer capacity in a pH region whose pKa is lower than the pKa of the functional group (for example, a carboxy group) that allows the particles to be stably dispersed in the ink.

—Organic Acid Salt—

Examples of the organic acid salt include salts of organic acids exemplified above.

Examples of the organic acid salt include organic acid salts containing alkaline earth metals of a group 2 (such as magnesium and calcium) in the periodic table, transition metals of a group 3 (such as lanthanum) in the periodic table, cations of a group 13 (such as aluminum) in the periodic table, and lanthanides (such as neodymium).

As the organic acid salt, an organic acid salt containing an alkaline earth metal is preferable, an organic acid salt containing calcium (such as calcium lactate or calcium acetate), or an organic acid salt containing magnesium (such as magnesium lactate or magnesium acetate) is preferable.

—Polyvalent Metal Compound—

Examples of the polyvalent metal compound include a salt (here, excluding the organic acid salt) containing at least one selected from the group consisting of alkaline earth metals of a group 2 (such as magnesium and calcium) in the periodic table, transition metals of a group 3 (such as lanthanum) in the periodic table, cations of a group 13 (such as aluminum) in the periodic table, and lanthanides (such as neodymium).

As the polyvalent metal compound, a nitrate, a chloride, or a thiocyanate is suitable.

As the polyvalent metal compound, a calcium salt or a magnesium salt of nitric acid, calcium chloride, magnesium chloride, or a calcium salt or a magnesium salt of thiocyanic acid is particularly preferable.

Further, it is preferable that at least a part of the polyvalent metal compound is dissociated into polyvalent metal ions and counterions in the pretreatment liquid.

—Metal Complex—

As the metal complex, a metal complex including at least one selected from the group consisting of zirconium, aluminum, and titanium as a metallic element is preferable.

As the metal complex, a metal complex including at least one selected from the group consisting of acetate, acetylacetonate, methylacetoacetate, ethylacetoacetate, octylene glycolate, butoxyacetylacetonate, lactate, lactate ammonium salt, and triethanol aminate as a ligand is preferable.

As the metal complex, various metal complexes are commercially available, and a commercially available metal complex may be used in the present disclosure. Further, various organic ligands, particularly various multidentate ligands that are capable of forming metal chelate catalysts are commercially available. Accordingly, a metal complex prepared by combining a commercially available organic ligand with a metal may be used.

The content of the aggregating agent is not particularly limited.

From the viewpoint of the aggregation rate of the ink, the content of the aggregating agent is preferably in a range of 0.1% by mass to 40% by mass, more preferably in a range of 0.1% by mass to 30% by mass, still more preferably in a range of 1% by mass to 20% by mass, and particularly preferably in a range of 1% by mass to 10% by mass with respect to the total amount of the pretreatment liquid.

—Resin—

It is preferable that the pretreatment liquid contains at least one resin.

Examples of the resin include an acrylic resin, a polyester resin, a polyolefin resin, a polyurethane resin, a polyurea resin, a polyamide resin, a polycarbonate resin, and a polystyrene resin.

It is preferable that the pretreatment liquid contains at least one kind of resin particles which are particles consisting of a resin.

In a case of preparing the pretreatment liquid, a commercially available product of an aqueous dispersion liquid of resin particles may be used.

Examples of the commercially available product of an aqueous dispersion liquid of resin particles include PESRESIN A124GP, PESRESIN A645GH, PESRESIN A615GE, and PESRESIN A520 (all manufactured by Takamatsu Oil & Fat Co., Ltd.), Eastek 1100 and Eastek 1200 (both manufactured by Eastman Chemical Company), PLASCOAT RZ570, PLASCOAT Z687, PLASCOAT Z565, PLASCOAT RZ570, and PLASCOAT Z690 (all manufactured by Goo Chemical Co., Ltd.), VYLONAL MD1200 (manufactured by Toyobo Co., Ltd.), EM57DOC (manufactured by Daicel FineChem Ltd.), and SUPERFLEX M500 (manufactured by DKS Co., Ltd.).

In a case where the pretreatment liquid contains resin particles, the content of the resin particles is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

—Water-Soluble Organic Solvent—

The pretreatment liquid may contain at least one water-soluble organic solvent.

As the water-soluble organic solvent, known solvents can be used without particular limitation.

Examples of the water-soluble organic solvent include the same solvents as the water-soluble organic solvents that can be contained in the ink.

In a case where the pretreatment liquid contains a water-soluble organic solvent, the content of the water-soluble organic solvent is preferably in a range of 0.5% by mass to 30% by mass, more preferably in a range of 1% by mass to 20% by mass, and particularly preferably in a range of 1% by mass to 15% by mass with respect to the total amount of the pretreatment liquid.

—Other Components—

The pretreatment liquid may contain other components as necessary in addition to the above-described components.

Examples of other components that may be contained in the pretreatment liquid include known additives such as a surfactant, a solid wetting agent, a silicic acid compound (such as colloidal silica), an inorganic salt, a fading inhibitor, an emulsion stabilizer, a penetration enhancer, an ultraviolet absorbing agent, a preservative, a fungicide, a pH adjuster, a viscosity adjuster, a rust inhibitor, a chelating agent, and a water-soluble polymer compound other than a water-soluble cationic polymer (for example, water-soluble polymer compounds described in paragraphs 0026 to 0080 of JP2013-001854A).

As other components that can be contained in the pretreatment liquid, components that can be contained in the first ink, described below, can also be referred to.

<Other Steps>

The recording method according to the present disclosure may include other steps in addition to the above-described steps.

Examples of the other steps include a step of laminating a base material for lamination on the image recorded on the impermeable base material. The image is effectively protected by laminating the base material for lamination on the image recorded on the impermeable base material.

As the base material for lamination, a resin base material is preferable.

The resin base material is not particularly limited, and examples thereof include a base material formed of a thermoplastic resin.

A base material obtained by molding a thermoplastic resin in a sheet shape is exemplified as the resin base material.

It is preferable that the resin base material contains polypropylene, polyethylene terephthalate, nylon, polyethylene, or polyimide.

The shape of the resin base material is not particularly limited, but it is preferable that the resin base material has a sheet shape.

The thickness of the resin base material is preferably in a range of 10 μm to 200 μm and more preferably in a range of 10 μm to 100 μm.

The base material for lamination may be laminated directly on a side of the image recorded material where the image has been disposed or through another layer (for example, an adhesive layer).

The base material for lamination in a case of being directly laminated on a side of the image recorded material where the image has been disposed can be laminated according to a known method such as thermocompression bonding or thermal fusion welding.

Further, the base material for lamination in a case of being laminated through an adhesive layer on a side of the image recorded material where the image has been disposed can be laminated according to, for example, a method of coating the side of the image recorded material where the image has been recorded with an adhesive, placing the base material for lamination, and bonding the image recorded material to the base material for lamination.

Further, the base material for lamination in the case of being laminated through an adhesive layer on a side of the image recorded material where the image has been recorded can be laminated according to an extrusion lamination method (that is, sandwich lamination) or the like.

It is preferable that the adhesive layer in the mode of laminating the base material through the adhesive layer on a side of the image recorded material where the image has been disposed contains an isocyanate compound.

In a case where the adhesive layer contains an isocyanate compound, since the adhesiveness between the adhesive layer and the ink-derived layer of the image is further improved, the lamination strength can be further improved.

EXAMPLES

Hereinafter, examples of the present disclosure will be described below, but the present disclosure is not limited to the following examples.

Further, the pH is a value measured at 25° C. using a pH meter (model name: WM-50EG, manufactured by DKK-Toa Corporation).

Examples 1 to 10 and Comparative Examples 1 to 3

Examples 1 to 10 and Comparative Examples 1 to 3 are examples and comparative examples for recording cyan monochromatic images.

Hereinafter, the details will be described.

<Preparation of Pretreatment Liquid>

The components described below were mixed to prepare a pretreatment liquid.

—Composition of Pretreatment Liquid—

- Glutaric acid [aggregating agent]: 6.1% by mass
- Propylene glycol [solvent]: 5.0% by mass
- OLFINE E1010 (manufactured by Nissin Chemical Industry Co., Ltd.) [surfactant]: 0.5% by mass
- SUPERFLEX 500M (manufactured by DKS Co., Ltd.) [aqueous dispersion of urethane resin particles]: 7.0% by mass
- Triisopropanolamine [pH adjuster]: 0.2% by mass
- BYK024 (manufactured by BYK-Chemie GmbH) [antifoaming agent]: 0.01% by mass
- Ultrapure water: remaining amount set such that total amount of pretreatment liquid reached 100% by mass <Preparation of Cyan Ink>

(Synthesis of Pigment Dispersing Agent P1)

965 g of dipropylene glycol was added to a 5,000 mL three-neck flask provided with a stirrer and a cooling pipe and heated to 85° C. in a nitrogen atmosphere.

A solution I obtained by dissolving 640 g of benzyl methacrylate, 340 g of methacrylic acid, and 19.94 g of 2-mercaptopropionic acid in 370.28 g of dipropylene glycol and a solution II obtained by dissolving 17.69 g of t-butyl peroxy-2-ethylhexanoate (product name, "PERBUTYL O", manufactured by NOF Corporation) in 221.17 g of dipropylene glycol were respectively prepared.

The solution I was added dropwise to the three-neck flask for 4 hours, and the solution II was added dropwise thereto for 5 hours. After completion of the dropwise addition, the solution was allowed to further react for 2 hours. The disappearance of the monomers was confirmed by $^1$H-NMR.

The obtained reaction solution was heated to 70° C., 248.02 g of a 50 mass % potassium hydroxide aqueous solution was added thereto, 107.48 g of dipropylene glycol and 75.52 g of pure water were added thereto, and the solution was stirred, thereby obtaining a 37 mass % solution of a random polymer. This random polymer was defined as a pigment dispersing agent P1.

The structural units constituting the obtained random polymer were confirmed by $^1$H-NMR. In addition, the weight-average molecular weight (Mw) was determined by GPC. The weight-average molecular weight (Mw) of the obtained pigment dispersing agent P1 was 8400, and the acid value thereof was 221.7 mgKOH/g.

(Preparation of Low Acid Value Cyan Pigment Dispersion Liquid)

150 parts by mass of the pigment dispersing agent P1 was dissolved in water, and a polymer aqueous solution was prepared such that the concentration of the pigment dispersing agent P1 was set to approximately 25% by mass. 180 parts by mass of the 25 mass % polymer aqueous solution, 90 parts by mass of PB15:3 (manufactured by Dainichiseika Color & Chemicals Mfg. Co., Ltd.), which is a cyan pigment, and 171.9 parts by mass of water were mixed to obtain a mixed solution. A potassium hydroxide aqueous solution was added to the obtained mixed solution, and the pH after neutralization was adjusted to 8.7.

Next, the mixed solution after neutralization was subjected to a dispersion treatment for 3 hours using a beads mill (bead diameter: 0.1 mmφ, zirconia beads). In this manner, a cyan pigment dispersion liquid (uncrosslinked dispersion liquid) in which the cyan pigment was dispersed by the pigment dispersing agent P1 was obtained. Water was added to the cyan pigment dispersion liquid to prepare an uncrosslinked dispersion liquid C1 (pigment concentration: 15% by mass).

Next, 3.77 parts by mass of trimethylolpropane polyglycidyl ether (product name, "Denacol EX-321", manufactured by Nagase ChemteX Corporation) as a crosslinking agent and 41.2 parts by mass of a boric acid aqueous solution (concentration of boric acid: 4% by mass) were added to 136 parts by mass of the uncrosslinked dispersion liquid (C1), and the mixture was allowed to react at 70° C. for 6 hours and cooled to 25° C. In this manner, the pigment dispersing agent P1 was crosslinked to obtain a cyan pigment dispersion liquid (crosslinked dispersion liquid) in which the cyan pigment was dispersed by a pigment dispersing agent P1a. Here, the pigment dispersing agent P1a is a polymer in which the pigment dispersing agent P1, which is an uncrosslinked polymer, is crosslinked with a crosslinking agent.

Next, ion exchange water was added to the crosslinked dispersion liquid such that the concentration of the pigment was set to 15% by mass. Ultrafiltration was performed by allowing the obtained liquid to flow into an ultrafiltration device (cross-flow type ultrafilter (UF), manufactured by Sartorius AG) provided with a polyether sulfone (PESU) film (size of micropores: 0.1 μm) at a flow rate of 600 mL per minute. At this time, the liquid temperature was adjusted to 25° C., and the ultrafiltration was performed 8 times by setting 1 time the volume magnification of the charged liquid as once. Ion exchange water was added to the obtained liquid such that the concentration of the pigment was set to 15% by mass. In this manner, a low acid value cyan pigment dispersion liquid was obtained. The acid value of the pigment dispersing agent P1a (low acid value crosslinked polymer) contained in the low acid value cyan pigment dispersion liquid was 75 mgKOH/g.

(Medium Acid Value Cyan Pigment Dispersion Liquid)

A medium acid value cyan pigment dispersion liquid was prepared in the same manner as in the preparation of the low acid value cyan pigment dispersion liquid described above except that the amounts of 3.77 parts by mass of trimethylolpropane polyglycidyl ether (product name, "Denacol EX-321", manufactured by Nagase ChemteX Corporation) as a crosslinking agent and 41.2 parts by mass of a boric acid aqueous solution (concentration of boric acid: 4% by mass) added to 136 parts by mass of the uncrosslinked dispersion liquid (C1) were respectively changed to 3.00 parts by mass of trimethylolpropane polyglycidyl ether and 32.8 parts by mass of a boric acid aqueous solution (concentration of boric acid: 4% by mass).

The acid value of a pigment dispersing agent P1b (specifically, a polymer in which the pigment dispersing agent P1 is crosslinked with a crosslinking agent) contained in the medium acid value cyan pigment dispersion liquid was 105 mgKOH/g.

(High Acid Value Cyan Pigment Dispersion Liquid)

A high acid value cyan pigment dispersion liquid was prepared in the same manner as in the preparation of the low acid value cyan pigment dispersion liquid described above except that the amounts of 3.77 parts by mass of trimethylolpropane polyglycidyl ether (product name, "Denacol EX-321", manufactured by Nagase ChemteX Corporation) as a crosslinking agent and 41.2 parts by mass of a boric acid aqueous solution (concentration of boric acid: 4% by mass) added to 136 parts by mass of the uncrosslinked dispersion liquid (C1) were respectively changed to 0.94 parts by mass of trimethylolpropane polyglycidyl ether and 10.3 parts by mass of a boric acid aqueous solution (concentration of boric acid: 4% by mass).

The acid value of the pigment dispersing agent P1b (specifically, a polymer in which the pigment dispersing agent P1 was crosslinked with a crosslinking agent) contained in the high acid value cyan pigment dispersion liquid was 185 mgKOH/g.

(Preparation of Cyan Inks C1 to C3)

The respective components of the following compositions were mixed together, thereby preparing cyan inks C1 to C3.

As the cyan pigment dispersion liquid in the following composition, the above-described medium acid value cyan pigment dispersion liquid was used in the cyan ink C1, the above-described low acid value cyan pigment dispersion liquid was used in the cyan ink C2, and the above-described high acid value cyan pigment dispersion liquid was used in the cyan ink C3.

—Compositions of Cyan Inks C1 to C3—

- Cyan pigment dispersion liquid (pigment is C.I. Pigment Blue 15:3): 4.0% by mass in terms of content of pigment
- Propylene glycol (water-soluble organic solvent): 30.0% by mass
- Propylene glycol monomethyl ether (water-soluble organic solvent): 1.0% by mass
- NeoCryl A-1105 (acrylic resin particle dispersion liquid) (manufactured by DSM): 5.0% by mass in terms of content of resin particles
- OLEFINE E1010 (manufactured by Nissin Chemical Co., Ltd., acetylene glycol-based surfactant): 1.0% by mass
- BYK3450 (silicone-based surfactant, manufactured by BYK-Chemie GmbH): 1.0% by mass
- PVPK15 (polyvinylpyrrolidone K15): 0.15% by mass
- ST-XS (colloidal silica dispersion liquid) (manufactured by Nissan Chemical Corporation): 0.05% by mass in terms of content of colloidal silica particles
- Water: remaining amount such that total amount of ink reached 100% by mass <Preparation of Impermeable Base Material>

The following three kinds of base materials were prepared as impermeable base materials (hereinafter, also simply referred to as "base materials").

- PET base material: polyethylene terephthalate base material (product name, "FE2001", manufactured by Futamura Chemical Co., Ltd., thickness of 12 μm, width of 100 mm, length of 240 mm)
- OPP base material: biaxially oriented polypropylene base material (FOR-AQ (20 μm), manufactured by Futamura Chemical Co., Ltd.)
- Nylon base material: EMBLEM ON (manufactured by UNITIKA Ltd., 15 μm)

<Preparation of Image Recording Device>

An image recording device including a transport mechanism for transporting a base material, and a wire bar coater for applying a pretreatment liquid and six ink jet heads for applying an ink (hereinafter, also simply referred to as "heads") in this order from an upstream side of the base material in the transport direction (hereinafter, also simply referred to as "upstream side") was prepared.

The six heads are aligned in the transport direction of the base material.

Hereinafter, the six heads will also be referred to as the first head, the second head, the third head, the fourth head, the fifth head, and the sixth head in order from the upstream side.

As each head, 1,200 dpi/20 inch-width piezo full line head was used. Here, dpi is an abbreviation for dot per inch.

Each of the heads is a line head in which nozzles are arranged in a direction (that is, the width direction of the base material) orthogonal to the transport direction of the base material.

As each of the heads, Samba G3L (manufactured by FUJIFILM DIMATIX) was used.

<Image Recording (Cyan Monochrome)>

The base material was subjected to a surface treatment by performing corona discharge on the base material under conditions of a discharge gap of 1 mm, 100 W, and 4 m/min using a corona treatment machine (corona surface modification evaluation device TEC-4AX, manufactured by KASUGA DENKI, INC.).

The above-described image recording device was prepared with the base material subjected to the surface treatment, the above-described pretreatment liquid, and the cyan ink (any of the cyan inks C1 to C3, see Table 1 for details). The cyan ink was set to be jetted from the second head. Further, an ink which was degassed through a degassing filter and in which the temperature thereof was adjusted to 30° C. was used as the cyan ink.

The pretreatment liquid was applied onto the base material using a wire bar coater while the base material was allowed to move at a constant speed of 50 m/min.

The mass of the pretreatment liquid applied was set to 1.5 g/$m^2$.

Here, the mass of the pretreatment liquid applied is a value obtained by dividing the mass of the applied pretreatment liquid by the area of the region where the pretreatment liquid was applied.

The pretreatment liquid, at a site where the application of the pretreatment liquid was completed, started drying with a dryer 2 seconds after the completion of the application of the pretreatment liquid to this site so that the pretreatment liquid was dried. The pretreatment liquid was dried under conditions of 60° C. for 3 seconds. The remaining water amount was 0.01 g/$m^2$ or less in a case where the measurement was performed using a Karl Fischer moisture meter.

Next, air was blown to the surface of the base material to which the pretreatment liquid had been applied, under conditions of an air pressure of 0.05 MPa and an air flow rate of 96 L/min using an ionizer ("SJ-L005M", manufactured by KEYENCE CORPORATION) separated from the surface by a distance of 10 cm. The amount of static electricity was adjusted by adjusting the air pressure and the air flow rate.

An amount A (unit: kV) of static electricity of the base material after the adjustment (specifically, the surface of the base material to which the pretreatment liquid had been applied) is listed in Table 1.

The cyan ink (any of the cyan inks C1 to C3, see Table 1 for details) was jetted from the second head and applied in the form of a solid image to the surface of the base material to which the pretreatment liquid had been applied while the base material in which the adjustment of the amount of static electricity was completed was allowed to move at a constant speed of 50 m/min. In this case, the droplet amount of the ink was set to 2.1 ng, the duty ratio was set to 100%, and the jetting frequency was set to 39.37 kHz.

Next, the cyan ink applied onto the base material was dried with infrared rays (IR) under a condition that the surface temperature of the ink reached 75° C. using an infrared (IR) irradiation device (PLC-328, manufactured by Noritake Co., Ltd.) 2 seconds after the completion of the application of the ink, and was further dried with warm air at 80° C. for 20 seconds using a dryer, thereby obtaining a cyan solid image.

In this manner, an image recorded material including a base material and a cyan solid image provided on the base material was obtained.

<Evaluation of Image Quality>

The following evaluations of the image quality were performed on the cyan solid image of the image recorded material.

The results are listed in Table 1.

(Jet Accuracy)

The image quality due to the jet accuracy in a direction (that is, a direction in which nozzles were aligned) orthogonal to the transport direction was evaluated according to the following evaluation standards by confirming the presence of streaks (specifically, dark streaks and white streaks) in the cyan solid image in the transport direction.

—Evaluation Standards for Jet Accuracy—

AA: Neither dark streaks nor white streaks were confirmed.

A: The total number of dark streaks and white streaks was 1 or more and less than 4.

B: The total number of dark streaks and white streaks was 4 or more and less than 8.

C: The total number of dark streaks and white streaks was 8 or more and less than 15.

D: The total number of dark streaks and white streaks was 15 or more.

(Jet Timing)

The image quality due to the jet timing was evaluated according to the following evaluation standards by confirming a shift of the jet timing in the cyan solid image, which was a shift of dots in the transport direction.

—Evaluation Standards for Jet Timing—

A: The shift of the jet timing was less than 1 dot.

B: The shift of the jet timing was 1 dot or more and less than 3 dots.

C: The shift of the jet timing was 3 dots or more and less than 5 dots.

D: The shift of the jet timing was 5 dots or more.

TABLE 1

| | Example 1 | Example 2 | Example 3 | Example 4 | Example 5 | Example 6 | Example 7 |
|---|---|---|---|---|---|---|---|
| Type of Impermeable base material | PET | PET | PET | PET | PET | OPP | OPP |
| Application of pretreatment liquid | Performed | Performed | Performed | Performed | Performed | Performed | Performed |
| Adjustment of static electricity of base material using ionizer | Performed | Performed | Performed | Performed | Performed | Performed | Performed |
| Amount of static electricity of base material (kV): A | 4 | 17 | 28 | 4 | 4 | 7 | 28 |
| Cyan ink No. | C1 | C1 | C1 | C2 | C3 | C1 | C1 |
| Zeta potential of ink (mV): B | −35 | −35 | −35 | −15 | −75 | −35 | −35 |
| Difference (A − B) | 39 | 52 | 63 | 19 | 79 | 42 | 63 |
| Results of evaluation — Image quality — Jet accuracy | B | A | AA | C | AA | B | AA |
| Results of evaluation — Image quality — Jet timing | A | A | A | A | B | A | A |

TABLE 1-continued

| | | | Example 8 | Example 9 | Example 10 | Comparative Example 1 | Comparative Example 2 | Comparative Example 3 |
|---|---|---|---|---|---|---|---|---|
| Type of Impermeable base material | | | OPP | Nylon | Nylon | PET | OPP | Nylon |
| Application of pretreatment liquid | | | Performed | Performed | Performed | Performed | Performed | Performed |
| Adjustment of static electricity of base material using ionizer | | | Performed | Performed | Performed | Performed | Performed | Performed |
| Amount of static electricity of base material (kV): A | | | 37 | 5 | 18 | −55 | −6 | −20 |
| Cyan ink No. | | | C1 | C1 | C1 | C2 | C1 | C1 |
| Zeta potential of ink (mV): B | | | −35 | −35 | −35 | −15 | −35 | −35 |
| Difference (A − B) | | | 72 | 40 | 53 | −40 | 29 | 15 |
| Results of evaluation | Image quality | Jet accuracy | AA | B | A | D | D | D |
| | | Jet timing | B | A | A | D | C | C |

As listed in Table 1, in Examples 1 to 10 in which the ink was applied onto the impermeable base material under the condition that the polarity of the static electricity on the surface of the impermeable base material to which the ink was applied was opposite to the polarity of the zeta potential of the ink, degradation of the image quality due to the decrease in the jet accuracy of the ink and the shift of the jet timing was suppressed in the obtained image.

On the contrary, in Comparative Examples 1 to 3 in which the ink was applied onto the impermeable base material under the condition that the polarity of the static electricity on the surface of the impermeable base material to which the ink was applied was the same as the polarity of the zeta potential of the ink, the image quality was degraded due to the decrease in the jet accuracy of the ink and/or the shift of the jet timing in the obtained image.

Among Examples 1 to 10, in Examples 1 to 3 and 5 to 10 in which the ink was applied under the condition that the difference [A−B] which was the value obtained by subtracting the zeta potential B (unit: mV) of the ink from the amount A (unit: kV) of static electricity on the surface of the impermeable base material to which the ink was applied was in a range of 30 to 110, degradation of the image quality due to the decrease in jet accuracy of the ink was further suppressed as compared with Example 4 in which the ink was applied under the condition that the difference [A−B] was less than 30.

Between Examples 1 and 2, in Example 2 in which the difference [A−B] was 45 or greater, degradation of the image quality due to the decrease in jet accuracy of the ink was further suppressed.

Between Examples 3 and 5, in Example 3 in which the difference [A−B] was 70 or less, degradation of the image quality due to the shift of the jet timing of the ink was further suppressed.

Examples 101 to 106

Examples 101 to 106 are examples for recording white monochrome images.

Hereinafter, the details will be described.

<Preparation of Pretreatment Liquid>

The components described below were mixed to prepare a pretreatment liquid.

—Composition of Pretreatment Liquid—

Glutaric acid [aggregating agent]: 6.1% by mass

Propylene glycol [solvent]: 5.0% by mass

OLFINE E1010 (manufactured by Nissin Chemical Industry Co., Ltd.) [surfactant]: 0.5% by mass SUPERFLEX 500M (manufactured by DKS Co., Ltd.) [aqueous dispersion of urethane resin particles]: 7.0% by mass Ultrapure water: remaining amount set such that total amount of pretreatment liquid reached 100% by mass <Preparation of White Ink>

(Synthesis of Pigment Dispersing Agent (Block Polymer) for Low Acid Value White Pigment Dispersion Liquid)

A block polymer 1 was synthesized as a pigment dispersing agent for a low acid value white pigment dispersion liquid with reference to Synthesis Example 8 of JP2015-83688A. The details are described below.

Diethylene glycol dimethyl ether (266 parts by mass; polymerization solvent), 2-iodo-2-cyanopropane (6.2 parts by mass; polymerization initiation compound), methyl methacrylate (MMA) (120 parts by mass; monomer), acrylic acid (AA) (28.8 parts by mass; monomer), cyclohexyl methacrylate (CHMA) (67.2 parts by mass; monomer), azobisdimethylisovaleronitrile (7.9 parts by mass), and 2-t-butyl-4,6-dimethylphenol (0.7 parts by mass; catalyst) were added to a 1 L separable flask reactor equipped with a stirrer, a backflow condenser, a thermometer, and a nitrogen introduction pipe, and the mixture was stirred while nitrogen was allowed to flow.

Next, the temperature (reaction temperature) of the mixture in the reactor was increased to 70° C., and the mixture was polymerized for 3 hours, thereby obtaining a polymerization solution A containing an MMA/AA/CHMA copolymer.

After 3 hours, as a result of sampling a part of the polymerization solution A and measuring the solid content, the solid content was 42.0% by mass, and thus it was confirmed that most of the monomers were polymerized.

Further, in a case where the molecular weight of the MMA/AA/CHMA copolymer was measured by GPC, the weight-average molecular weight (Mn) was 7,500.

The acid value of this MMA/AA/CHMA copolymer was 101.0 mgKOH/g.

Next, a mixture of benzyl methacrylate (BzMA) (35.2 parts by mass; monomer) and V-65 (0.3 parts by mass; radical generator) was added to the polymerization solution A described above, and the mixture was polymerized at 70° C. for 3 hours, thereby obtaining a polymerization solution B containing the block polymer 1 as a pigment dispersing agent for a low acid value white pigment dispersion liquid.

Here, the block polymer 1 is a block polymer containing an A block which is an MMA/AA/CHMA copolymer and a B block which is a BzMA homopolymer.

As a result of measurement of the solid content in the obtained polymerization solution B, the solid content thereof was 43.2% by mass and it was confirmed that most of the monomers were polymerized.

Further, the Mw of the block polymer 1 was 8,500, and the acid value thereof was 89.3 mgKOH/g.

(Preparation of Low Acid Value White Pigment Dispersion Liquid)

The block polymer 1 (136.4 parts by mass), butyl carbitol (163.6 parts by mass), and C.I. Pigment White 6 (trade name, "JR-405", manufactured by Tayca Co., Ltd., titanium dioxide particles) (450 parts by mass) as a white pigment were blended with each other and stirred with a disper. Next, the white pigment was sufficiently dispersed using a horizontal media disperser, thereby obtaining an oil-based pigment dispersion liquid. The average particle diameter of the white pigment dispersed in the oil-based pigment dispersion liquid was 290 nm. The viscosity of the oil-based pigment dispersion liquid was 86.3 mPa·s.

Next, a mixed solution consisting of potassium hydroxide (4.0 parts by mass) and water (341 parts by mass) was gradually added to the oil-based pigment dispersion liquid (700 parts by mass) while being stirred using a disper, and the solution was neutralized. Thereafter, the white pigment was sufficiently dispersed using a horizontal media disperser, thereby obtaining a pigment dispersion liquid.

Next, ultrafiltration was performed by allowing ion exchange water to flow through the obtained pigment dispersion liquid at a flow rate of 600 mL per minute using an ultrafiltration device (cross-flow type ultrafilter (UF), manufactured by Sartorius AG). The liquid temperature was maintained at 25° C., and the ultrafiltration was performed ten times by setting one time the volume of the charged liquid to once. Ion exchange water was added thereto to obtain a low acid value white pigment dispersion liquid in which the concentration of the white pigment was 45% by mass and the concentration of the block polymer was 3.7% by mass.

(Preparation of Medium Acid Value White Pigment Dispersion Liquid)

—Synthesis of Pigment Dispersing Agent P1—

A pigment dispersing agent P1 (uncrosslinked polymer) which was the same as the pigment dispersing agent P1 used in the preparation of each cyan pigment dispersion liquid described above was synthesized.

—Preparation of Medium Acid Value White Pigment Dispersion Liquid—

The pigment dispersing agent P1 (150 parts by mass) was dissolved in water to prepare a polymer solution in which the concentration of the pigment dispersing agent P1 was 25% by mass.

96 parts by mass of the polymer solution, 300 parts by mass of C.I. Pigment White 6 (trade name, "JR-405", manufactured by Tayca Co., Ltd., titanium dioxide particles) as a white pigment, and 270 parts by mass of water were mixed to obtain a mixed solution. A potassium hydroxide aqueous solution was added to the obtained mixed solution, and the pH after neutralization was adjusted to 8.7.

Next, the mixed solution after neutralization was subjected to a dispersion treatment for 3 hours using a beads mill (bead diameter: 0.1 mmφ, zirconia beads). In this manner, a white pigment dispersion liquid (uncrosslinked dispersion liquid) PD1 in which the white pigment was dispersed by the pigment dispersing agent P1 was obtained.

Next, ultrafiltration was performed by allowing ion exchange water to flow through the obtained white pigment dispersion liquid (uncrosslinked dispersion liquid) PD1 at a flow rate of 600 mL per minute using an ultrafiltration device (cross-flow type ultrafilter (UF), manufactured by Sartorius AG). The liquid temperature was maintained at 25° C., and the ultrafiltration was performed three times by setting one time the volume of the charged liquid to once. Ion exchange water was added to the liquid after the ultrafiltration, thereby obtaining a dispersion liquid after ultrafiltration in which the concentration of the white pigment was 45% by mass and the concentration of the pigment dispersing agent P1 was 3.6% by mass.

1.35 parts by mass of trimethylolpropane polyglycidyl ether (product name, "Denacol EX-321", manufactured by Nagase ChemteX Corporation) as a crosslinking agent and 14.5 parts by mass of a boric acid aqueous solution (concentration of boric acid: 4% by mass) were added to 136 parts by mass of the dispersion liquid after ultrafiltration, and the mixture was allowed to react at 70° C. for 6 hours and cooled to 25° C. In this manner, a pigment dispersing agent P1a serving as a crosslinked polymer dispersing agent was formed by crosslinking the pigment dispersing agent P1 in the dispersion liquid, thereby obtaining a white pigment dispersion liquid (crosslinked dispersion liquid) in which the white pigment was dispersed by the pigment dispersing agent P1a which was a crosslinked polymer dispersing agent L1.

Ion exchange water was added to the obtained crosslinked dispersion liquid such that the concentration of the pigment was set to 15% by mass. Ultrafiltration was performed by allowing the crosslinked dispersion liquid to which ion exchange water had been added to flow into an ultrafiltration device (cross-flow type ultrafilter (UF), manufactured by Sartorius AG) provided with a polyether sulfone (PESU) film (size of micropores: 0.1 μm) at a flow rate of 600 mL per minute. At this time, the liquid temperature was adjusted to 25° C., and the ultrafiltration was performed three times by setting 1 time the volume magnification of the charged liquid as once. Next, ion exchange water was added such that the concentration of the white pigment was set to 45% by mass. In this manner, a medium acid value white pigment dispersion liquid was obtained.

The acid value of the pigment dispersing agent P1a contained in the medium acid value white pigment dispersion liquid was 144 mgKOH/g. Further, the concentration of the pigment dispersing agent P1a was 3.6% by mass.

The pigment dispersing agent P1a is a crosslinked polymer in which the pigment dispersing agent P1, which is an uncrosslinked polymer, is crosslinked by polyethylene glycol diglycidyl ether serving as a crosslinking agent.

(Preparation of High Acid Value White Pigment Dispersion Liquid)

A high acid value white pigment dispersion liquid was prepared in the same manner as in the preparation of the medium acid value white pigment dispersion liquid described above except that the amounts of 1.35 parts by mass of trimethylolpropane polyglycidyl ether (product name, "Denacol EX-321", manufactured by Nagase ChemteX Corporation) as a crosslinking agent and 14.5 parts by mass of a boric acid aqueous solution (concentration of boric acid: 4% by mass) added to 136 parts by mass of the dispersion liquid after ultrafiltration were respectively changed to 0.63 parts by mass of trimethylolpropane polyglycidyl ether and 7.25 parts by mass of a boric acid aqueous solution (concentration of boric acid: 4% by mass).

The acid value of the pigment dispersing agent P1b (specifically, a polymer in which the pigment dispersing agent P1 was crosslinked with a crosslinking agent) contained in the high acid value white pigment dispersion liquid was 185 mgKOH/g.

(Preparation of White Inks W1 to W3)

The respective components of the following compositions were mixed together, thereby preparing white inks W1 to W3.

As the white pigment dispersion liquid in the following composition, the above-described medium acid value white pigment dispersion liquid was used in the white ink W1, the above-described low acid value white pigment dispersion liquid was used in the white ink W2, and the above-described high acid value white pigment dispersion liquid was used in the white ink W3.

—Composition of White Inks W1 to W3—

White pigment dispersion liquid: 14% by mass (in terms of content of pigment)

Propylene glycol (water-soluble organic solvent): 30% by mass

Propylene glycol monomethyl ether (water-soluble organic solvent): 1% by mass

NeoCryl A-1105 (acrylic polymer resin particle dispersion liquid) (manufactured by DSM): 5.0% by mass (in terms of content of resin particles)

OLEFINE E1010 (manufactured by Nissin Chemical Co., Ltd., acetylene glycol-based surfactant): 1.0% by mass BYK3450 (silicone-based surfactant, manufactured by BYK-Chemie GmbH): 1.0% by mass PVPK15 (polyvinylpyrrolidone K15): 0.15% by mass ST-XS (colloidal silica dispersion liquid) (manufactured by Nissan Chemical Corporation): 0.05% by mass in terms of content of colloidal silica particles Water: remaining amount set such that total amount of composition was 100% by mass <Preparation of Base Material and Image Recording Device>

The same base material and the same image recording device as the base material (that is, the impermeable base material) and the image recording device used in Example 1 were respectively prepared.

<Image Recording (White Monochrome)>

An image recorded material including a base material and a white solid image provided on the base material was obtained by performing the same operation as in the image recording of Example 1 except that the white ink (any of the white inks W1 to W3, see Table 2 for details) set to be jetted from the fifth head was used in place of the cyan ink set to be jetted from the second head and the ink droplet amount was changed to 4.0 ng.

<Evaluation of Image Quality>

The same evaluations as the evaluations of the image quality of the cyan solid image in Example 1 were performed on the white solid image in the image recorded material.

The results are listed in Table 2.

TABLE 2

| | Example 101 | Example 102 | Example 103 | Example 104 | Example 105 | Example 106 |
|---|---|---|---|---|---|---|
| Type of impermeable base material | PET | PET | PET | PET | OPP | Nylon |
| Application of pretreatment liquid | Performed | Performed | Performed | Performed | Performed | Performed |
| Adjustment of static electricity of base material using ionizer | Performed | Performed | Performed | Performed | Performed | Performed |
| Amount of static electricity of base material (kV): A | 17 | 28 | 17 | 17 | 7 | 18 |
| White ink No. | W1 | W1 | W2 | W3 | W1 | W1 |
| Zeta potential of ink (mV): B | −45 | −45 | −28 | −70 | −45 | −45 |
| Difference (A − B) | 62 | 73 | 45 | 87 | 52 | 63 |
| Results of evaluation — Image quality — Jet accuracy | AA | AA | A | AA | B | AA |
| Results of evaluation — Image quality — Jet timing | A | B | A | B | A | A |

As listed in Table 2, similarly to Examples 1 to 10, even in Examples 101 to 106 in which the ink was applied onto the impermeable base material under the condition that the polarity of the static electricity on the surface of the impermeable base material to which the ink was applied was opposite to the polarity of the zeta potential of the ink, degradation of the image quality due to the decrease in the jet accuracy of the ink and the shift of the jet timing was suppressed in the obtained image.

Examples 201 to 209

Examples 201 to 209 are examples for recording multi-layer images using an ink set including a pretreatment liquid, a colored ink (specifically, at least one of a black ink, a cyan ink, a magenta ink, or a yellow ink), and a white ink. Hereinafter, the details will be described.

<Preparation of Pretreatment Liquid>

The same pretreatment liquid as the pretreatment liquid prepared in Example 101 was prepared.

<Preparation of Cyan Ink>

The cyan inks C1 and C2 described above were prepared.

<Preparation of White Ink>

The white ink W1 described above was prepared.

<Preparation of Black Ink>

(Synthesis of Pigment Dispersing Agent P1)

A pigment dispersing agent P1 (uncrosslinked polymer) which was the same as the pigment dispersing agent P1 used in the preparation of each cyan pigment dispersion liquid described above was synthesized.

(Preparation of Black Pigment Dispersion Liquid)

150 parts by mass of the pigment dispersing agent P1 was dissolved in water, and a polymer aqueous solution was prepared such that the concentration of the pigment dispersing agent P1 was set to approximately 25% by mass. 180 parts by mass of the 25 mass % polymer aqueous solution, 110.0 parts by mass of FW182 (manufactured by Orion), which is a carbon black pigment, and 240.0 parts by mass of water were mixed to obtain a mixed solution. A potassium hydroxide aqueous solution was added to the obtained mixed solution, and the pH after neutralization was adjusted to 8.7.

Next, the mixed solution after neutralization was subjected to a dispersion treatment for 3 hours using a beads mill (bead diameter: 0.1 mmφ, zirconia beads). In this manner, a black pigment dispersion liquid (uncrosslinked dispersion liquid) in which the black pigment was dispersed by the pigment dispersing agent P1 was obtained. Water was added to the black pigment dispersion liquid to prepare an uncrosslinked dispersion liquid K1 (pigment concentration: 15% by mass).

Next, 2.40 parts by mass of trimethylolpropane polyglycidyl ether (product name, "Denacol EX-321", manufactured by Nagase ChemteX Corporation) as a crosslinking agent and 26.2 parts by mass of a boric acid aqueous solution (concentration of boric acid: 4% by mass) were added to 136 parts by mass of the uncrosslinked dispersion liquid (K1), and the mixture was allowed to react at 70° C. for 6 hours and cooled to 25° C. In this manner, the pigment dispersing agent P1 was crosslinked to obtain a black pigment dispersion liquid (crosslinked dispersion liquid) in which the black pigment was dispersed by the pigment dispersing agent P1a. Here, the pigment dispersing agent P1a is a polymer in which the pigment dispersing agent P1, which is an uncrosslinked polymer, is crosslinked with a crosslinking agent.

Next, ion exchange water was added to the crosslinked dispersion liquid such that the concentration of the pigment was set to 15% by mass. Ultrafiltration was performed by allowing the obtained liquid to flow into an ultrafiltration device (cross-flow type ultrafilter (UF), manufactured by Sartorius AG) provided with a polyether sulfone (PESU) film (size of micropores: 0.1 μm) at a flow rate of 600 mL per minute. At this time, the liquid temperature was adjusted to 25° C., and the ultrafiltration was performed 8 times by setting 1 time the volume magnification of the charged liquid as once. Ion exchange water was added to the obtained liquid such that the concentration of the pigment was set to 15% by mass. In this manner, a black pigment dispersion liquid was obtained. The acid value of the pigment dispersing agent P1a (crosslinked polymer) contained in the black pigment dispersion liquid was 105 mgKOH/g.

(Preparation of Black Ink K1)

The respective components of the following composition were mixed together, thereby preparing a black ink K1.

—Composition of Black Ink K1—

- Black pigment dispersion liquid: 5.0% by mass in terms of content of pigment
- Propylene glycol (water-soluble organic solvent): 30.0% by mass
- Propylene glycol monomethyl ether (water-soluble organic solvent): 1.0% by mass
- NeoCryl A-1105 (acrylic polymer resin particle dispersion liquid) (manufactured by DSM): 5.0% by mass in terms of content of resin particles
- OLEFINE E1010 (manufactured by Nissin Chemical Co., Ltd., acetylene glycol-based surfactant): 1.0% by mass
- BYK3450 (silicone-based surfactant, manufactured by BYK-Chemie GmbH): 1.0% by mass
- PVPK15 (polyvinylpyrrolidone K15): 0.15% by mass
- ST-XS (colloidal silica dispersion liquid) (manufactured by Nissan Chemical Corporation): 0.05% by mass in terms of content of colloidal silica particles
- Water: remaining amount set such that total amount of composition was 100% by mass <Preparation of Magenta Ink>

(Preparation of PR-122 Dispersion Liquid)

A PR-122 dispersion liquid was prepared in the same manner as in the preparation of the black pigment dispersion liquid except that the operation of "180 parts by mass of the 25 mass % polymer aqueous solution, 110.0 parts by mass of FW182 (manufactured by Orion), which is a carbon black pigment, and 240.0 parts by mass of water were mixed" was changed to an operation of "180 parts by mass of a 25 mass % polymer aqueous solution, 90 parts by mass of PR-122 (Pigment Red 122) (FUJI Fast Red (registered trademark), manufactured by Fuji Pigment Co., Ltd.), which is a magenta pigment, and 171.9 parts by mass of water were mixed", and the operation of "2.40 parts by mass of trimethylolpropane polyglycidyl ether (product name, "Denacol EX-321", manufactured by Nagase ChemteX Corporation) as a crosslinking agent and 26.2 parts by mass of a boric acid aqueous solution (concentration of boric acid: 4% by mass) were added" was changed to an operation of "3.00 parts by mass of trimethylolpropane polyglycidyl ether (product name, "Denacol EX-321", manufactured by Nagase ChemteX Corporation) as a crosslinking agent and 32.8 parts by mass of a boric acid aqueous solution (concentration of boric acid: 4% by mass) were added".

The acid value of the pigment dispersing agent P1a (crosslinked polymer) contained in the PR-122 dispersion liquid was 105 mgKOH/g.

<Preparation of PR-254 Dispersion Liquid>

A PR-254 dispersion liquid A was obtained in the same manner as in the preparation of the PR-122 dispersion liquid except that PR-122 was changed to the same content (parts by mass) of PR-254 (C.I. Pigment Red 254).

The acid value of the pigment dispersing agent P1a (crosslinked polymer) contained in the PR-254 dispersion liquid A was 105 mgKOH/g.

(Preparation of PR-150 Dispersion Liquid)

A PR-150 dispersion liquid was obtained in the same manner as in the preparation of the PR-122 dispersion liquid except that PR-122 was changed to the same content (parts by mass) of PR-150 (C.I. Pigment Red 150).

The acid value of the pigment dispersing agent P1a (crosslinked polymer) contained in the PR-150 dispersion liquid was 105 mgKOH/g.

(Preparation of PR-254 Dispersion Liquid B)

A PR-254 dispersion liquid B was prepared in the same manner as in the preparation of the PR-254 dispersion liquid A described above except that the amounts of 3.00 parts by mass of trimethylolpropane polyglycidyl ether (product name, "Denacol EX-321", manufactured by Nagase ChemteX Corporation) as a crosslinking agent and 32.8 parts by mass of a boric acid aqueous solution (concentration of boric acid: 4% by mass) added to 136 parts by mass of the uncrosslinked dispersion liquid were respectively changed to 0.94 parts by mass of trimethylolpropane polyglycidyl ether and 10.3 parts by mass of a boric acid aqueous solution (concentration of boric acid: 4% by mass).

The acid value of the pigment dispersing agent P1b (specifically, a polymer in which the pigment dispersing agent P1 was crosslinked with a crosslinking agent) contained in the PR-254 dispersion liquid B was 185 mgKOH/g.

(Preparation of Magenta Ink M1)

The respective components of the following composition were mixed together, thereby preparing a magenta ink M1.

—Composition of Magenta Ink M1—

- PR-122 dispersion liquid described above: 4.5% by mass in terms of content of pigment
- PR-254 dispersion liquid A described above: 1.5% by mass in terms of content of pigment
- Propylene glycol (water-soluble organic solvent): 30.0% by mass
- Propylene glycol monomethyl ether (water-soluble organic solvent): 1.0% by mass
- NeoCryl A-1105 (acrylic polymer resin particle dispersion liquid) (manufactured by DSM): 5.0% by mass in terms of content of resin particles
- OLEFINE E1010 (manufactured by Nissin Chemical Co., Ltd., acetylene glycol-based surfactant): 1.0% by mass
- BYK3450 (silicone-based surfactant, manufactured by BYK-Chemie GmbH): 1.0% by mass
- PVPK15 (polyvinylpyrrolidone K15): 0.15% by mass
- ST-XS (colloidal silica dispersion liquid) (manufactured by Nissan Chemical Corporation): 0.05% by mass in terms of content of colloidal silica particles
- Water: remaining amount set such that total amount of composition was 100% by mass (Preparation of Magenta Ink M2)

The respective components of the following composition were mixed together, thereby preparing a magenta ink M2.

—Composition of Magenta Ink M2—

- PR-122 dispersion liquid described above: 4.5% by mass in terms of content of pigment
- PR-254 dispersion liquid B described above: 1.5% by mass in terms of content of pigment
- Propylene glycol (water-soluble organic solvent): 30.0% by mass
- Propylene glycol monomethyl ether (water-soluble organic solvent): 1.0% by mass
- NeoCryl A-1105 (acrylic polymer resin particle dispersion liquid) (manufactured by DSM): 5.0% by mass in terms of content of resin particles
- OLEFINE E1010 (manufactured by Nissin Chemical Co., Ltd., acetylene glycol-based surfactant): 1.0% by mass
- BYK3450 (silicone-based surfactant, manufactured by BYK-Chemie GmbH): 1.0% by mass
- PVPK15 (polyvinylpyrrolidone K15): 0.15% by mass
- ST-XS (colloidal silica dispersion liquid) (manufactured by Nissan Chemical Corporation): 0.05% by mass in terms of content of colloidal silica particles
- Water: remaining amount set such that total amount of composition was 100% by mass (Preparation of Magenta Ink M3)

The respective components of the following composition were mixed together, thereby preparing a magenta ink M3.

—Composition of Magenta Ink M3—

- PR-122 dispersion liquid described above: 4.5% by mass in terms of content of pigment
- PR-150 dispersion liquid described above: 1.5% by mass in terms of content of pigment
- Propylene glycol (water-soluble organic solvent): 30.0% by mass
- Propylene glycol monomethyl ether (water-soluble organic solvent): 1.0% by mass
- NeoCryl A-1105 (acrylic polymer resin particle dispersion liquid) (manufactured by DSM): 5.0% by mass in terms of content of resin particles
- OLEFINE E1010 (manufactured by Nissin Chemical Co., Ltd., acetylene glycol-based surfactant): 1.0% by mass
- BYK3450 (silicone-based surfactant, manufactured by BYK-Chemie GmbH): 1.0% by mass
- PVPK15 (polyvinylpyrrolidone K15): 0.15% by mass
- ST-XS (colloidal silica dispersion liquid) (manufactured by Nissan Chemical Corporation): 0.05% by mass in terms of content of colloidal silica particles
- Water: remaining amount set such that total amount of composition was 100% by mass <Preparation of Yellow Ink>

(Preparation of Yellow Pigment Dispersion Liquid)

A yellow pigment dispersion liquid was prepared in the same manner as in the preparation of the black pigment dispersion liquid except that the operation of "180 parts by mass of the 25 mass % polymer aqueous solution, 110.0 parts by mass of FW182 (manufactured by Orion), which is a carbon black pigment, and 240.0 parts by mass of water were mixed" was changed to an operation of "180 parts by mass of a 25 mass % polymer aqueous solution, 75 parts by mass of PY-74 (C.I. Pigment Yellow 74) (FUJI Fast Red (registered trademark), manufactured by Fuji Pigment Co., Ltd.), which is a yellow pigment, and 140 parts by mass of water were mixed", and the operation of "2.40 parts by mass of trimethylolpropane polyglycidyl ether (product name, "Denacol EX-321", manufactured by Nagase ChemteX Corporation) as a crosslinking agent and 26.2 parts by mass of a boric acid aqueous solution (concentration of boric acid: 4% by mass) were added" was changed to an operation of "3.60 parts by mass of trimethylolpropane polyglycidyl ether (product name, "Denacol EX-321", manufactured by Nagase ChemteX Corporation) as a crosslinking agent and 39.4 parts by mass of a boric acid aqueous solution (concentration of boric acid: 4% by mass) were added".

The acid value of the pigment dispersing agent P1a (crosslinked polymer) contained in the yellow pigment dispersion liquid was 105 mgKOH/g.

(Preparation of Yellow Ink Y1)

The respective components of the following composition were mixed together, thereby preparing a yellow ink Y1.

—Composition of Yellow Ink Y1—

- Yellow pigment dispersion liquid described above: 4.0% by mass in terms of content of pigment
- PR-150 dispersion liquid described above: 1.5% by mass in terms of content of pigment
- Propylene glycol (water-soluble organic solvent): 30.0% by mass
- Propylene glycol monomethyl ether (water-soluble organic solvent): 1.0% by mass
- NeoCryl A-1105 (acrylic resin particle dispersion liquid) (manufactured by DSM): 5.0% by mass in terms of content of resin particles
- OLEFINE E1010 (manufactured by Nissin Chemical Co., Ltd., acetylene glycol-based surfactant): 1.0% by mass
- BYK3450 (silicone-based surfactant, manufactured by BYK-Chemie GmbH): 1.0% by mass
- PVPK15 (polyvinylpyrrolidone K15): 0.15% by mass
- ST-XS (colloidal silica dispersion liquid) (manufactured by Nissan Chemical Corporation): 0.05% by mass in terms of content of colloidal silica particles
- Water: remaining amount set such that total amount of composition was 100% by mass <Preparation of Base Material and Image Recording Device>

The same base material and the same image recording device as the base material (that is, the impermeable base material) and the image recording device used in Example 1 were respectively prepared.

<Image Recording (Multilayer Images)>

Image recording (multilayer image) was performed in the same manner as in the image recording (cyan monochrome) in Example 1 except for the following points.

—Differences from Image Recording (Cyan Monochrome) in Example 1—

Each ink was set so that the ink listed in Table 3 was jetted from the first to sixth heads. In Table 3, "-" in the columns of the ink No. denotes that the corresponding ink was not used.

The operation of applying the cyan ink in the form of a solid image onto the surface of the base material where the adjustment of the amount of static electricity had been completed and the pretreatment liquid had been applied was changed to an operation of sequentially applying each of the inks listed in Table 3 in the form of solid images in an overlapping manner onto the surface of the base material where the adjustment of the amount of static electricity had been completed and the pretreatment liquid had been applied.

The amount of the white ink applied was set to 4.0 ng and the amount of other inks applied was set to 2.1 ng. The duty ratio during the application of each ink was as listed in Table 3. Each ink was applied such that the inks overlapped each other on the same region.

Next, the ink of the outermost layer in all the inks applied onto the base material in an overlapping manner (that is, the ink applied last) was dried with infrared rays (IR) under a condition that the surface temperature of the ink reached 75° C. using an infrared (IR) irradiation device (PLC-328, manufactured by Noritake Co., Ltd.) 2 seconds after the completion of the application of the ink, which was applied last, and was further dried with warm air at 80° C. for 20 seconds using a dryer, thereby obtaining multilayer solid images.

As described above, an image recorded material including a base material and multilayer solid images provided on the base material was obtained. In all the examples, the outermost layer of the multilayer solid images is a white image derived from the white ink W1.

<Evaluation of Image Quality>

The image recorded material was placed on a black portion of Hiding Power Test Paper (JIS approved product, manufactured by TP Giken Co., Ltd.) such that the image recorded surface (that is, the surface of the base material) of the image recorded material was in contact with the black portion.

The multilayer images of the image recorded material in this state were visually observed from the white image which was the outermost layer, and streaks (specifically, dark streaks and white streaks) were confirmed.

The image quality was evaluated based on the confirmed results according to the following evaluation standards.

The streaks in the multilayer images are defects due to the decrease in jet accuracy and/or the shift of the jet timing.

—Evaluation Standards for Image Quality—

AA: The total number of dark streaks and white streaks was 0 or more and less than 5.

A: The total number of dark streaks and white streaks was 5 or more and less than 10.

B: The total number of dark streaks and white streaks was 10 or more and less than 20.

C: The total number of dark streaks and white streaks was 20 or more and less than 30.

D: The total number of dark streaks and white streaks was 30 or more.

The results are listed in Table 3.

TABLE 3

| | | Example 201 | Example 202 | Example 203 | Example 204 | Example 205 | Example 206 | Example 207 | Example 208 | Example 209 |
|---|---|---|---|---|---|---|---|---|---|---|
| Type of impermeable base material | | PET | PET | PET | PET | PET | PET | PET | PET | OPP |
| Application of pretreatment liquid | | Performed | Performed | Performed | Performed | Performed | Performed | Performed | Performed | Performed |
| Adjustment of static electricity of base material using ionizer | | Performed | Performed | Performed | Performed | Performed | Performed | Performed | Performed | Performed |
| Amount of static electricity of base material (kV): A | | 17 | 17 | 17 | 17 | 17 | 17 | 17 | 17 | 28 |
| First head | Ink No. | — | — | — | — | K1 | K1 | K1 | K1 | K1 |
| | Zeta potential (mV): B | — | — | — | — | −30 | −30 | −30 | −30 | −30 |
| | Duty ratio (%) | — | — | — | — | 50% | 50% | 50% | 50% | 50% |
| Second head | Ink No. | C1 | C1 | C1 | C2 | C1 | C1 | C2 | C1 | C1 |
| | Zeta potential (mV): B | −35 | −35 | −35 | −75 | −35 | −35 | −75 | −35 | −35 |
| | Duty ratio (%) | 100% | 100% | 100% | 100% | 50% | 50% | 50% | 50% | 50% |
| Third head | Ink No. | — | M1 | M2 | M2 | M1 | M3 | M3 | M1 | M1 |
| | Zeta potential (mV): B | — | −37 | −52 | −52 | −37 | −37 | −37 | −37 | −37 |
| | Duty ratio (%) | — | 100% | 100% | 100% | 50% | 50% | 50% | 50% | 50% |
| Fourth head | Ink No. | — | — | — | — | Y1 | Y1 | Y1 | Y1 | Y1 |
| | Zeta potential (mV): B | — | — | — | — | −40 | −40 | −40 | −40 | −40 |
| | Duty ratio (%) | — | — | — | — | 50% | 50% | 50% | 50% | 50% |
| Fifth head | Ink No. | W1 | W1 | W1 | W1 | W1 | W1 | W1 | W1 | W1 |
| | Zeta potential (mV): B | −45 | −45 | −45 | −45 | −45 | −45 | −45 | −45 | −45 |
| | Duty ratio (%) | 100% | 100% | 100% | 100% | 100% | 100% | 100% | 50% | 50% |
| Sixth head | Ink No. | — | — | — | — | — | — | — | W1 | W1 |
| | Zeta potential (mV): B | — | — | — | — | — | — | — | −45 | −45 |
| | Duty ratio (%) | — | — | — | — | — | — | — | 50% | 50% |
| Difference [A − B] for ink applied last | | 62 | 62 | 62 | 62 | 62 | 62 | 62 | 62 | 73 |
| Results of evaluation | Image quality: Evaluation of streaks in multilayer images | AA | AA | A | B | AA | AA | A | AA | AA |

As listed in Table 3, in Examples 201 to 209 in which the ink set including at least one colored ink (that is, at least one of the black ink K1, the cyan inks C1 and C2, the magenta inks M1 to M3, or the yellow ink Y1) and at least one white ink (that is, the white ink W1) was used and these inks were respectively applied onto the base material in a state where Condition a1, Condition a2, and Condition a3 were satisfied, degradation of the image quality (that is, streaks) due to the decrease in the jet accuracy and/or the shift of the jet timing was suppressed.

Condition a1: The polarities of the zeta potentials of all the inks which are at least one colored ink and at least one white ink are the same as each other.

Condition a2: The polarity of the static electricity on the identical surface of the impermeable base material is opposite to the polarities of the zeta potentials of all the inks.

Condition a3: In a case where the amount of the static electricity on the identical surface of the impermeable base material is defined as A kV and the zeta potential of each of at least one colored ink and at least one white ink is defined as B mV, a difference [A−B] which is a value obtained by subtracting B from A is in a range of 30 to 110 in all the inks.

As shown in the results of Examples 201 to 209, it was found that in a case where the difference [A−B] for the ink applied last among the differences [A−B] for each of the inks was greatest (Examples 201, 202, 205, 206, 208, and 209), degradation of the image quality was further suppressed.

Examples 1A to 10A

The same operations as in Examples 1 to 10 were performed except that the pretreatment liquid was not applied in Examples 1 to 10.

As a result, the same effects as in Examples 1 to 10 were obtained.

Examples 1B to 10B, 101B to 106B, and 201B to 209B

The same operations as in Examples 1 to 10, 101 to 106, and 201 to 209 were performed except that "6.1% by mass of glutaric acid" in the composition of the pretreatment liquid was replaced with "0.6% by mass of glutaric acid, 5.0% by mass of adipic acid, and 0.5% by mass of succinic acid" in each of Examples 1 to 10, 101 to 106, and 201 to 209.

As a result, the same effects as in Examples 1 to 10, 101 to 106, and 201 to 209 were obtained.

Examples 1C to 101C, 101C to 106C, and 201C to 209C

The same operations as in Examples 1 to 10, 101 to 106, and 201 to 209 were performed except that "6.1% by mass of glutaric acid" in the composition of the pretreatment liquid was replaced with "0.6% by mass of glutaric acid, 5.0% by mass of adipic acid, and 0.5% by mass of succinic acid" and the acrylic resin particles in the ink were replaced with the same amount of styrene acrylic resin particles ("NeoCryl A-1109" (manufactured by DSM) was used as a resin particle dispersion liquid) in each of Examples 1 to 10, 101 to 106, and 201 to 209.

As a result, the same effects as in Examples 1 to 10, 101 to 106, and 201 to 209 were obtained.

Examples 1D to 10D, 101D to 106D, and 201D to 209D

The same operations as in Examples 1 to 10, 101 to 106, and 201 to 209 were performed except that "6.1% by mass of glutaric acid" in the composition of the pretreatment liquid was replaced with "5.0% by mass of calcium formate and 3.0% by mass of calcium lactate" in each of Examples 1 to 10, 101 to 106, and 201 to 209.

As a result, the same effects as in Examples 1 to 10, 101 to 106, and 201 to 209 were obtained.

Examples 1E to 10E, 101E to 106E, and 201E to 209E

The same operations as in Examples 1 to 10, 101 to 106, and 201 to 209 were performed except that "6.1% by mass of glutaric acid" in the composition of the pretreatment liquid was replaced with "5.0% by mass of calcium formate and 3.0% by mass of calcium lactate" and the acrylic resin in the ink was replaced with the same amount of a styrene acrylic resin ("NeoCryl A-1109", manufactured by DSM) in each of Examples 1 to 10, 101 to 106, and 201 to 209.

As a result, the same effects as in Examples 1 to 10, 101 to 106, and 201 to 209 were obtained.

Examples 1F to 10F, 101F to 106F, and 201F to 209F

The same operations as in Examples 1 to 10, 101 to 106, and 201 to 209 were performed except that "6.1% by mass of glutaric acid" in the composition of the pretreatment liquid was replaced with "5.0% by mass of calcium formate and 3.0% by mass of calcium lactate" and the acrylic resin particles in the ink were replaced with the same amount of urethane resin particles ("SUPERFLEX 460" (manufactured by DKS Co., Ltd.) was used as a resin particle dispersion liquid) in each of Examples 1 to 10, 101 to 106, and 201 to 209.

As a result, the same effects as in Examples 1 to 10, 101 to 106, and 201 to 209 were obtained.

Examples 1G to 10G, 101G to 106G, and 201G to 209G

The same operations as in Examples 1 to 10, 101 to 106, and 201 to 209 were performed except that "6.1% by mass of glutaric acid" in the composition of the pretreatment liquid was replaced with "0.6% by mass of glutaric acid, 5.0% by mass of adipic acid, and 0.5% by mass of succinic acid" and the acrylic resin particles in the ink were replaced with the same amount of urethane resin particles ("SUPERFLEX 460" (manufactured by DKS Co., Ltd.) was used as a resin particle dispersion liquid) in each of Examples 1 to 10, 101 to 106, and 201 to 209.

As a result, the same effects as in Examples 1 to 10, 101 to 106, and 201 to 209 were obtained.

The disclosure of JP2021-191601 filed on Nov. 25, 2021 is incorporated herein by reference in its entirety.

All documents, patent applications, and technical standards described in the present specification are incorporated herein by reference to the same extent as in a case of being specifically and individually noted that individual documents, patent applications, and technical standards are incorporated by reference.

What is claimed is:

1. An ink jet recording method comprising:

applying an ink containing water onto an impermeable base material using an ink jet method, wherein the ink is applied onto the impermeable base material under a condition that a polarity of static electricity on a surface of the impermeable base material to which the ink is applied is opposite to a polarity of a zeta potential of the ink, and wherein the ink is applied onto the impermeable base material under a condition that in a case where an amount of the static electricity on the surface of the impermeable base material to which the ink is applied is defined as A kV and the zeta potential of the ink is defined as B mV, a difference [A−B] which is a value obtained by subtracting B from A is in a range of 30 to 110.

2. The ink jet recording method according to claim 1, wherein the ink is applied onto the impermeable base material under a condition that the difference [A−B] is in a range of 45 to 70.

3. The ink jet recording method according to claim 1, wherein the zeta potential of the ink is in a range of −80 mV to −30 mV.

4. The ink jet recording method according to claim 1, wherein the amount of the static electricity on the surface of the impermeable base material to which the ink is applied is in a range of 10 kV to 30 kV.

5. The ink jet recording method according to claim 1, wherein the impermeable base material is a resin base material.

6. The ink jet recording method according to claim 1, further comprising:

applying a pretreatment liquid that contains water and an aggregating agent onto the impermeable base material before applying the ink, wherein, the ink is applied onto a region of the impermeable base material to which the pretreatment liquid has been applied.

7. An ink jet image recording device configured to be used in the ink jet recording method according to claim 6, the device comprising a transport mechanism configured to transport the impermeable base material, and the device further comprising: a wire bar coater configured to apply the pretreatment liquid; and an ink jet head configured to apply the ink, in this order from an upstream side in a transport direction of the impermeable base material.

8. The ink jet recording method according to claim 1, wherein an ink set including at least one colored ink that contains water and a color pigment and at least one white ink that contains water and a white pigment is used, and wherein each of the at least one colored ink and the at least one white ink is applied onto an identical surface of the impermeable base material using an ink jet method in a state where Condition a1, Condition a2, and Condition a3 are satisfied, Condition a1: polarities of zeta potentials of all the inks which are the at least one colored ink and the at least one white ink are the same as each other, Condition a2: the polarity of the static electricity on the identical surface of the impermeable base material is opposite to the polarities of the zeta potentials of all the inks, and Condition a3: in a case where an amount of the static electricity on the identical surface of the impermeable base material is defined as A kV and the zeta potential of each of the at least one colored ink and the at least one white ink is defined as B mV, a difference [A−B] which is a value obtained by subtracting B from A is in a range of 30 to 110 in all the inks.

9. The ink jet recording method according to claim 8, wherein the difference [A−B] for an ink to be applied last is greatest among the differences [A−B] for the ink set.

10. The ink jet recording method according to claim 8, wherein in a case where n represents an integer of 2 or greater for the ink set, the difference [A−B] for an n-th ink in application order is greater than or equal to the difference [A−B] for an n-1-th ink in application order, and the difference [A−B] for an ink to be applied last is greater than the difference [A−B] for an ink to be applied first.

11. An ink jet recording method comprising:

applying an ink containing water onto an impermeable base material using an ink jet method, wherein the ink is applied onto the impermeable base material under a condition that a polarity of static electricity on a surface of the impermeable base material to which the ink is applied is opposite to a polarity of a zeta potential of the ink, and wherein an amount of the static electricity on the surface of the impermeable base material to which the ink is applied is in a range of 10 kV to 30 kV.

12. The ink jet recording method according to claim 11, wherein the impermeable base material is a resin base material.

13. The ink jet recording method according to claim 11, further comprising:

applying a pretreatment liquid that contains water and an aggregating agent onto the impermeable base material before applying the ink, wherein the ink is applied onto a region of the impermeable base material to which the pretreatment liquid has been applied.

14. An ink jet image recording device configured to be used in the ink jet recording method according to claim 13, the device comprising a transport mechanism configured to transport the impermeable base material, and the device further comprising: a wire bar coater configured to apply the pretreatment liquid; and an ink jet head configured to apply the ink, in this order from an upstream side in a transport direction of the impermeable base material.

* * * * *